United States Patent [19]
Garza

[11] Patent Number: 5,739,969
[45] Date of Patent: Apr. 14, 1998

[54] DIGITAL DATA STORAGE USING PREDETERMINED INCREMENTS OF TIME WHEREIN EACH INCREMENT REPRESENTS A PLURALITY OF BITS OF INFORMATION

[75] Inventor: Ricardo R. Garza, Pasadena, Tex.

[73] Assignee: Inwave Technologies, Inc., Houston, Tex.

[21] Appl. No.: 280,775

[22] Filed: Jul. 26, 1994

[51] Int. Cl.[6] .................. G11B 5/09; G11B 5/02
[52] U.S. Cl. .................. 360/51; 360/29; 360/40; 341/53
[58] Field of Search .................. 360/29, 40, 46, 360/51; 341/53; 375/22, 238

[56] References Cited

U.S. PATENT DOCUMENTS

| | | | |
|---|---|---|---|
| 4,072,944 | 2/1978 | Bianco et al. | 343/7 PF |
| 4,343,023 | 8/1982 | Nishimura et al. | 360/40 |
| 4,423,419 | 12/1983 | Johannessen | 343/387 |
| 4,575,773 | 3/1986 | Dymond | 360/32 |
| 4,595,959 | 6/1986 | Bailey | 360/67 |
| 4,821,253 | 4/1989 | Usui et al. | 369/54 |
| 4,823,196 | 4/1989 | Godddard | 360/35.1 |
| 4,873,680 | 10/1989 | Chung et al. | 369/54 |
| 4,949,196 | 8/1990 | Davie et al. | 360/40 |
| 4,955,013 | 9/1990 | Healey . | |
| 4,979,052 | 12/1990 | Matsuta et al. | 360/40 |
| 5,070,495 | 12/1991 | Bletscher, Jr. et al. | 369/116 |
| 5,119,243 | 6/1992 | Shimazaki et al. | 360/46 |
| 5,121,369 | 6/1992 | Makansi | 369/13 |
| 5,165,089 | 11/1992 | Jaquette et al. | 369/59 |
| 5,185,733 | 2/1993 | Finkelstein et al. | 369/54 |
| 5,204,848 | 4/1993 | Cardero et al. | 369/48 |
| 5,268,893 | 12/1993 | Call et al. | 369/116 |
| 5,335,116 | 8/1994 | Onishi et al. | 360/40 |

OTHER PUBLICATIONS

Ferrel G. Stremler, *Introduction to Communication Systems*, pp. 651–652 (3rd ed. 1992).

Jerry Pournelle, *"Web Exclusive: Of Big Floppy Disks, Modems, and Talking to Computers"*, pp. 1–2 (Mar. 1997).

*Primary Examiner*—Aristotelis M. Psitos
*Assistant Examiner*—Regina Y. Neal
*Attorney, Agent, or Firm*—Baker & Botts, L.L.P.

[57] ABSTRACT

A storage system for storing information on a magnetic media is embodied within a conversion device. The system is operable to store data within a bit cell by receiving data from a controller board (14), which data is generated by a Central Processing Unit (CPU) (52). This data is convened from an ordinary Modified Frequency Modulation (MFM) format received on a bus (32) and then convened to a Super High Density (SHD) data format. In the SHD format, a counter is provided for counting down from an initial starting time corresponding to a reference pulse (102) to an end count value corresponding to the value of a data word. The time between the reference pulse and the end of count value constitutes the length of time from the beginning of the bit cell to the position in the bit cell at which a data pulse is recorded. During a decode operation, i.e. a Read operation, it is only necessary to determine the position of the data pulse within the bit cell with a counter that counts from the predetermined reference pulse to the position of the detected data pulse. This corresponds to a data value. Therefore, a multiple bit data word can be encoded within a given bit cell.

27 Claims, 17 Drawing Sheets

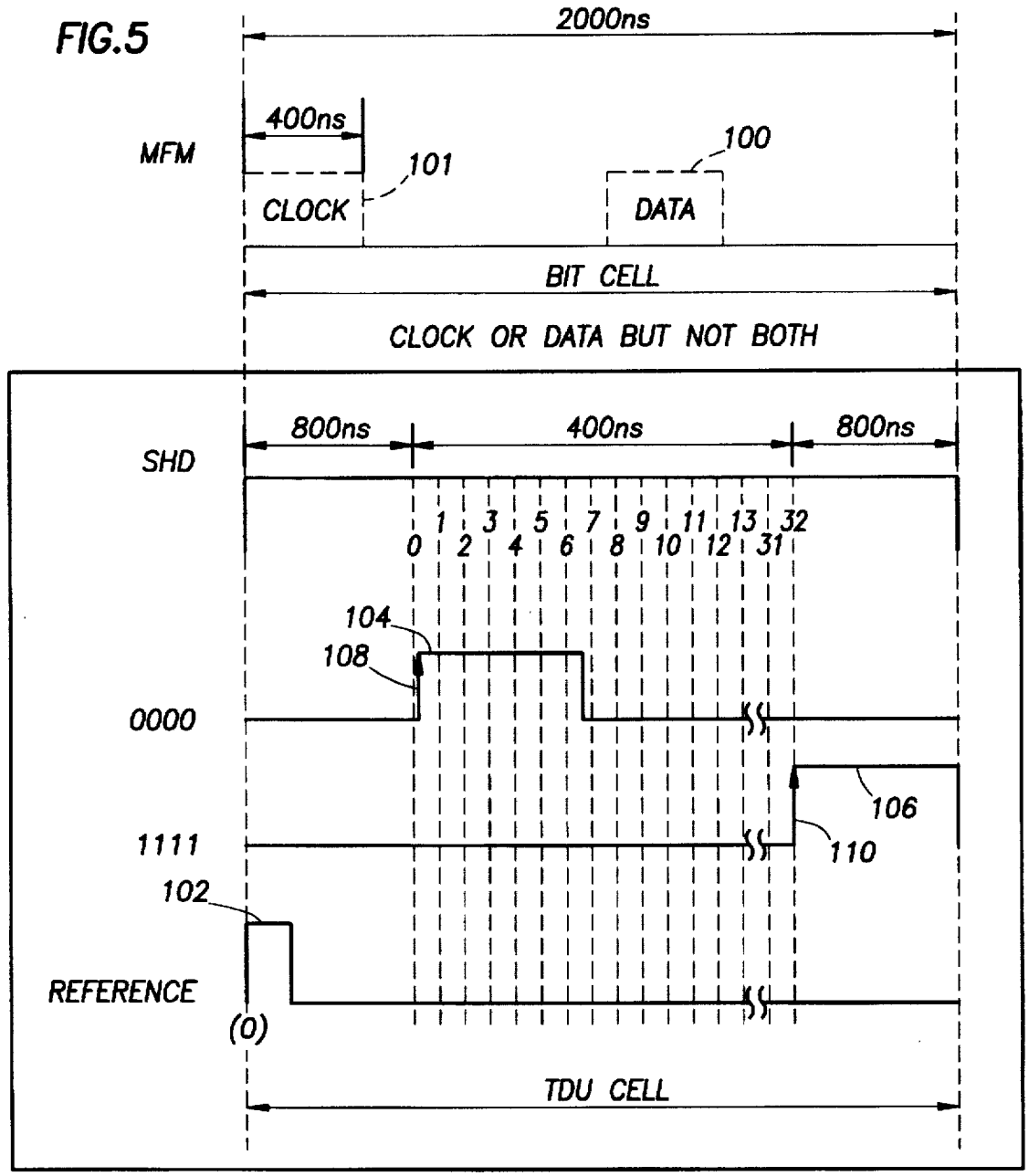
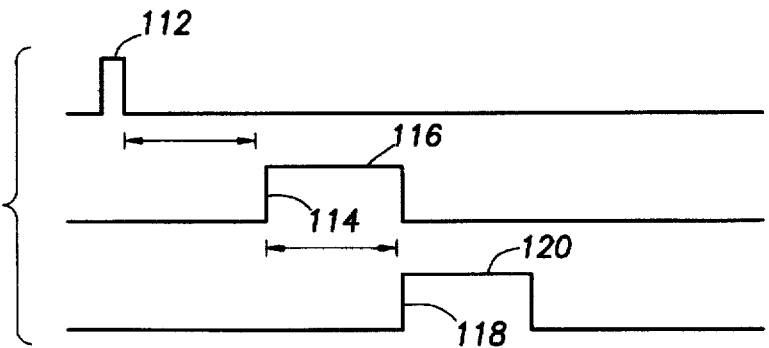
FIG.5
FIG.5a

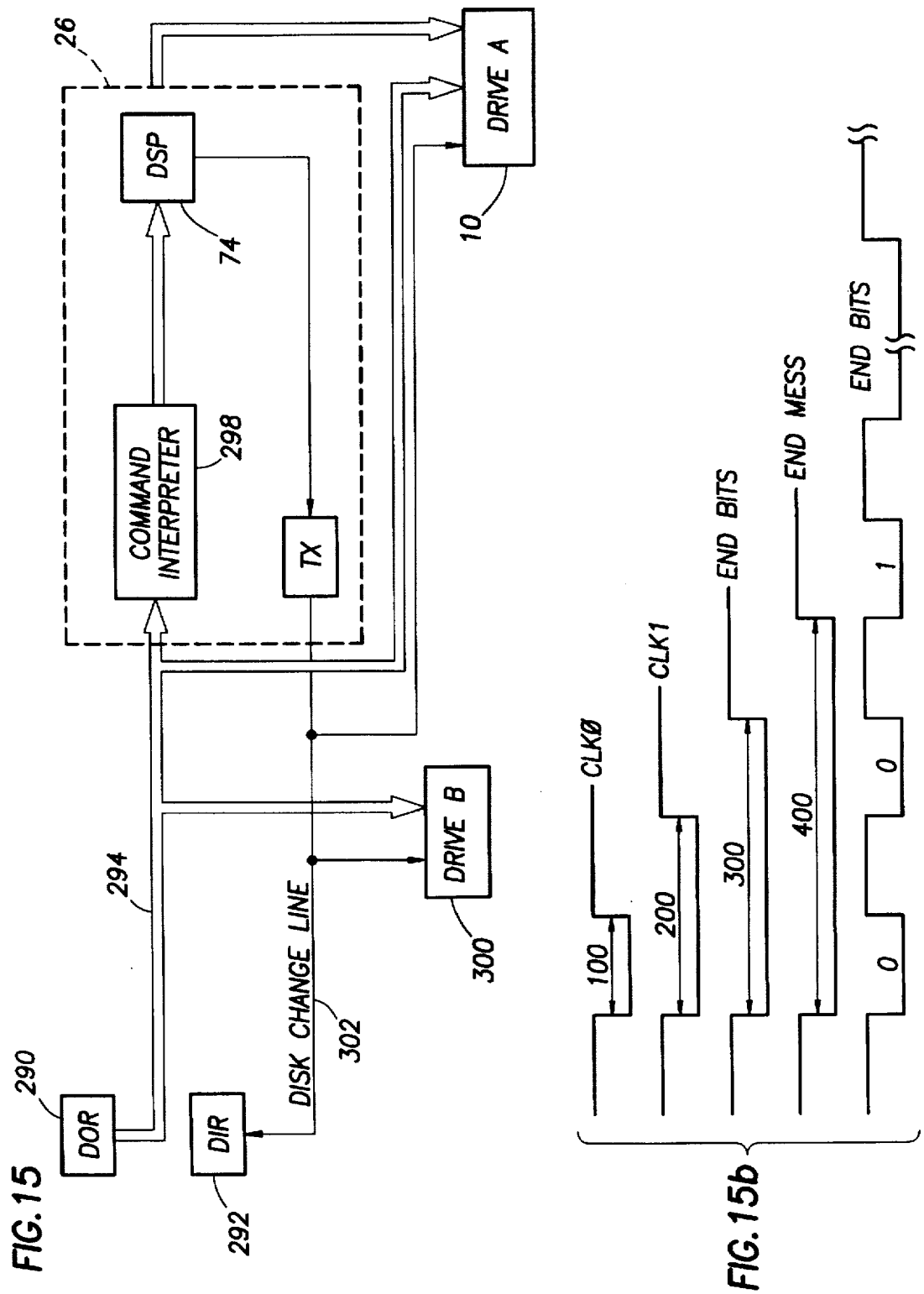

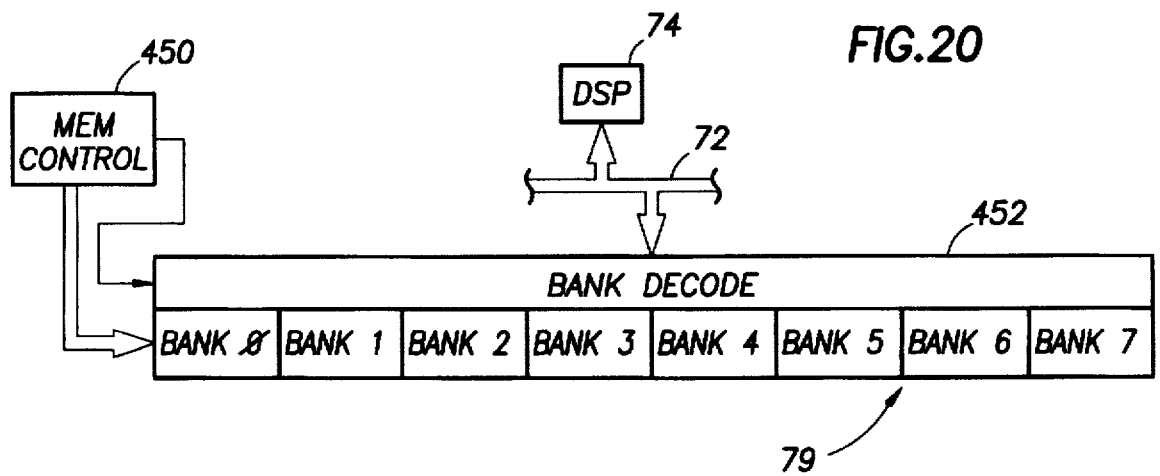

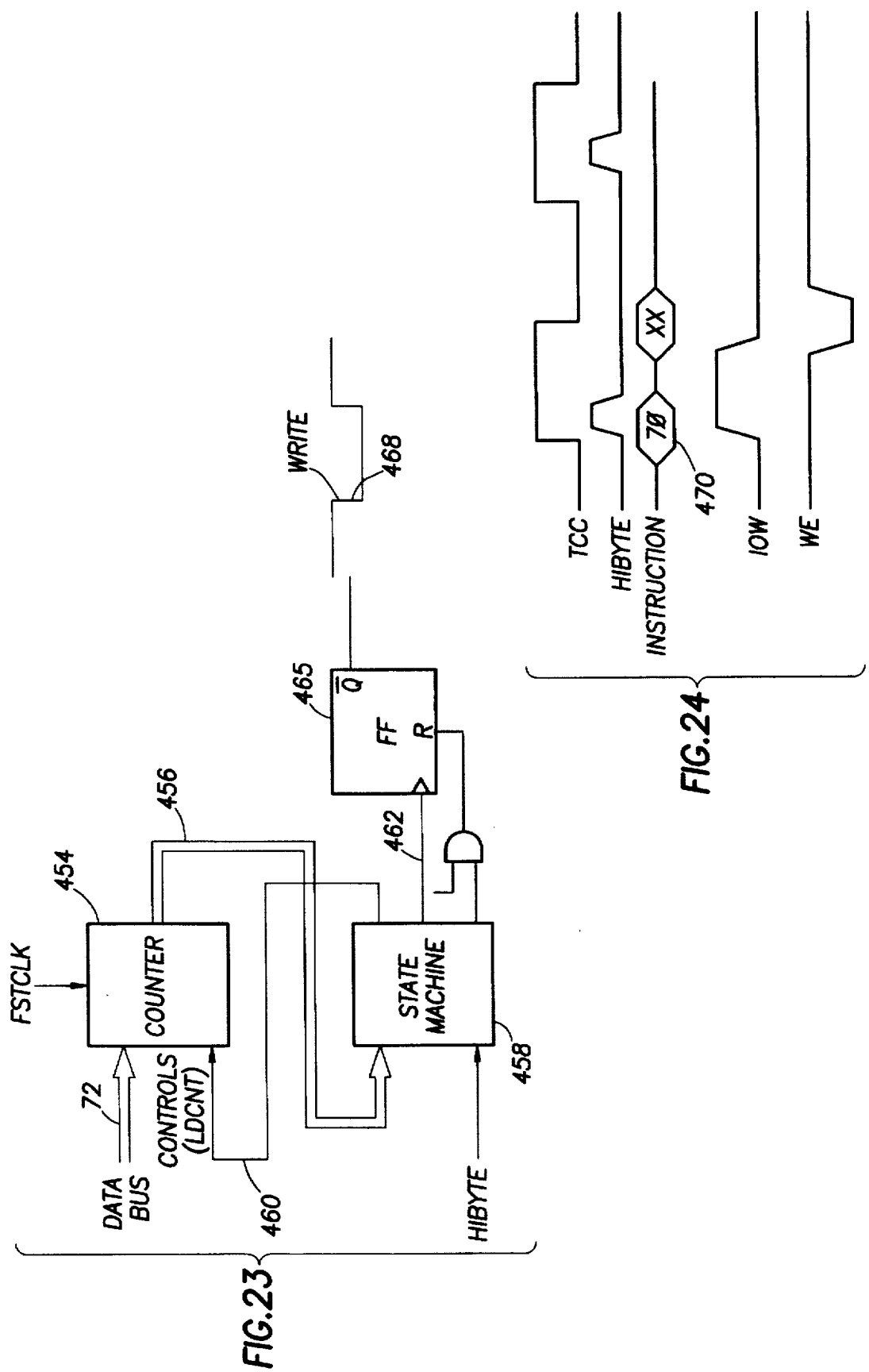

5,739,969

DIGITAL DATA STORAGE USING PREDETERMINED INCREMENTS OF TIME WHEREIN EACH INCREMENT REPRESENTS A PLURALITY OF BITS OF INFORMATION

TECHNICAL FIELD OF THE INVENTION

The present invention pertains in general to floppy drives for Personal Computers, and more particularly, the method and apparatus for increasing the density of data stored on a typical floppy disk and allowing the interchangability of these higher density disks and conventional lower density disks in a conventional drive.

BACKGROUND OF THE INVENTION

Mass storage devices for personal computers (PCs) have changed over the years and continue to change. The need for increased density in the drives to accommodate the user's insatiable appetite for storage space has seen storage devices evolve from the original "floppy" drives to the present hard drives and even optical drives. The floppy drives comprise a removable media that is relatively inexpensive, whereas the hard drives typically comprised a fixed media. However, some current hard drives can be removed. Optical drives also constitute a removable media with the exception that they provide a significantly higher density of data storage.

From a marketing standpoint, the floppy drives have been well accepted from the original 5¼" disks having a capacity of 360 Kilobytes to the present 3½" drives having a capacity of 1.44 Megabytes. These drives have seen wide acceptance among PC users and, as such, the cost of media and the drives has significantly decreased. As this technology has evolved, the various modulation techniques for increasing the amount of data that can be stored on a magnetic media has allowed the use of a smaller form factor with an increased density. As noted above, the original floppy disks utilized a 5¼" inch form factor and a relatively "flimsy" jacket. The current 3½" form factor disks provide a higher density and also a hard jacket. However, the 3½" form factor disks are not compatible with the 5¼" form factor drives. As such, two different drives are required to accommodate the two different types of disks.

When the 3½" form factor disks were initially introduced, they were considerably more expensive than the 5¼" form factor drive. This has changed due to the volume purchases of the 3½" form factor drives such that the price has decreased dramatically both for the drive and for the media. One aspect that has led to increased acceptance by the public of the 3½" form factor disk is the fact that it fits in a user's pocket, whereas the 5¼" form factor disk must be carded in a brief case or a separate pouch.

Although the fixed hard drives provide significantly higher density storage, they are not practical for transporting data in a convenient form, nor are the portable hard drives feasible as a portable data media. At present, software packages have seen significant increases in the amount of storage space required to store both the program and the underlying data. For example, some word processing programs five years ago required approximately 500–750k worth of storage space on the hard disk. This required a commensurate amount of disk space to transfer the program to the user. Of course, this could typically fit on three to four low density floppy disks. The present version of these programs can require as much as 30 Megabytes of storage space to store all the information necessary to run the program due to the increased power and added features of the program, especially the inclusion of significant graphics. Even with file compression, six to seven high density 3½" form factor disks are required in order to transfer the program and underlying data to the user. Even though significantly higher data storage is provided in the form of optical disks, such as CD ROMs, the associated drives are still not as widely used as the 3½" floppy drive, nor are they as inexpensive. The only disadvantage to the 3½" form factor drive and associated media is the limited density.

The density of a 3½" disk system is limited by the drive architecture, the controller board that interfaces between the computer and the drive and the modulation technique. The most widely used modulation technique is the Modified Frequency Modulation (MFM) technique. This technique, like all previous techniques, requires that each bit of data occupy a certain "bit space" about a track, the track being defined about a given cylinder or common radial path on the surface of the disk. These are typically referred to as the tracks, there being 80 tracks on a floppy disk. However, each track has the same amount of data disposed thereon, with the unique formatting for each track incorporating various sized gaps therein to account for the length of the track for different radial positions.

Although higher density medias have been proposed, the disadvantage is that they are significantly more expensive and are not standard. The industry has gravitated toward the standard of the 3½" floppy disk form factor. Any other form factor would require a different drive and a different media. The initial costs for these drives and the associated media would be significantly higher than the present drives and associated media. For example, one of the currently proposed higher density drives is a 2.88 Megabyte floppy disk drive which has 3½" form factor. These drives tend to be a factor of two higher in cost, whereas the media itself is approximately seven to ten times higher in price. Therefore, it is still far less expensive to store data and program material on a 3½" 1.44 Megabyte disk, as one can be ensured that a large percentage of computers will be compatible with both the format on the disk and the form factor thereof. However, there still exists a strong need for a higher density formatting technique without significantly increasing the expense or in any way disturbing the compatibility of the present drives.

SUMMARY OF THE INVENTION

The present invention disclosed and claimed herein comprises a high density magnetic media data storage system. The data storage system includes a data buffer for storing the data words that are to be stored on the magnetic media. A timing system defines bit cells on the surface of the magnetic media along the surface as the surface passes a fixed point. The bit cells each have a defined time length, all bit cells having the same length in time. The timing system is operable to define a reference pulse for each bit cell. A modulator then defines a variable length of time from the reference pulse to a record time within the bit cell. The variable length of time is defined by a received one of the words. A record mechanism is provided for recording a magnetic flux pulse in the magnetic media at the record time within the bit cell, such that it is positioned within the bit cell as a function of the value of the data word. A data bit controller is operable to sequentially feed the data words from the data buffer to the modulator during sequential ones of the bit cells.

In another aspect of the present invention, the variable length of time between the reference pulse and the record time is divided up into a plurality of increments. Each of the increments is referenced to a bit clock cycle such that each increment is a predetermined number of bit clock cycles. Each increasing value of the data word increases the variable length of time by an increment. A demodulator is provided for demodulating the data in the bit cells. The demodulator includes a Read device that is operable to pass over the bit cells at a predetermined rate and determine the length of time between the reference pulse and the recorded magnetic flux pulse within the bit cells. The recorded magnetic flux is detected to generate a detected Read pulse. The reset pulse is operable to start a counter, which counts incrementally according to the increments of the variable length of time. The counter is stopped upon the occurrence of the Read pulse to provide a count value. The count value is then converted into a data word.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a diagrammatic view of the pulse width modulation technique of the present invention for the pulse width modulation technique;

FIG. 5a illustrates an alternate embodiment illustrating a duplex operation;

FIG. 15 illustrates a logic diagram of the Load operation;

FIG. 15b illustrates a timing diagram for the communication protocol;

FIG. 20 illustrates a diagrammatic view of the multiple bank memory for purposes of describing the Write operation;

FIG. 21 illustrates a more detailed diagrammatic view of the memory and a register of the DSP utilized for a description of the Write operation;

FIG. 22 illustrates an alternate Write operation;

FIG. 23 illustrates a diagrammatic view of the counter and state machine operation;

FIG. 24 illustrates a timing diagram for one method of the Read operation;

DETAILED DESCRIPTION OF THE INVENTION

Figure 1:
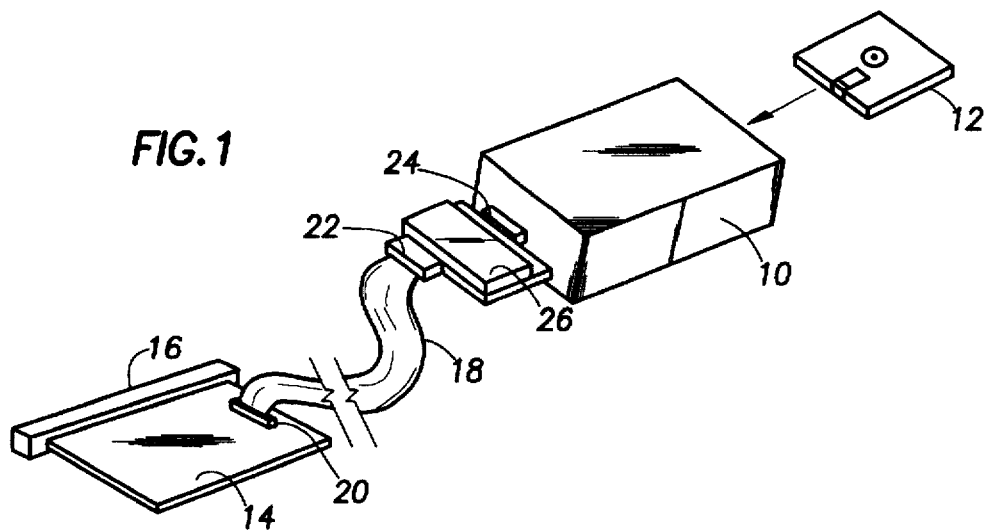
FIG. 1 illustrates a perspective view of the hardware implementation of the system of the present invention.

Referring now to FIG. 1, there is illustrated a perspective view of the device of the present invention utilized in conjunction with a 3.5" form factor drive 10. The 3.5" form factor drive 10 is designed to accept a 3.5" form factor floppy disk 12 having a magnetic media disposed therein. This magnetic media 12 is removable. As designed, the drive 10 operates in conjunction with a controller board 14 to accommodate one of three disk densities, either 720 Kilobytes (720K), 1.44 Megabytes (1.44M) or 2.88 Megabytes (2.88M). The controller board 14 is disposed in a connector 16, typically referred to as a "slot" within a PC (not shown). A controller cable 18 is operable to be connected to the controller board via a connector 20 and then to the drive 10 via a connector 22 on the cable 18 and a connector 24 on the drive 10.

When the connector 22 is connected with the connector 24, the drive 10 will operate normally utilizing a modified frequency modulation (MFM) technique. This typically allows a data rate transfer of approximately 500 Kbps. Again, this is a conventional operation. However, in accordance with the present invention, as will be described in more detail hereinbelow, a conversion device 26 is provided which is disposed between the connector 22 and the connector 24 and is operable to allow the density of data storage on the disk 12 to be increased up to, for example 14.4 Megabytes. This, of course, requires a different formatting which is referred to as a Super High Density (SHD) format. This is a proprietary format and, therefore, requires a specific drive configuration to accommodate this drive format. As will also be described hereinbelow, the conversion device 26 modifies a conventional 3.5" form factor drive that is originally designed to operate on a 1.44M/720K disk density and the associated controller board 14 to provide the SHD format, this done transparent to both the user and the PC. This conversion device 26 will also allow the drive 10 to accept a disk 12 that is formatted for a 1.44M density configuration. This is all done transparent to the system and the user. It is therefore only necessary for the user to insert the conversion device 26 between the connectors 22 and 24 to allow the density of the drive to be raised to a higher density of, for example, 14.4M. As noted, this is all done with very minor hardware changes.

Figure 2:
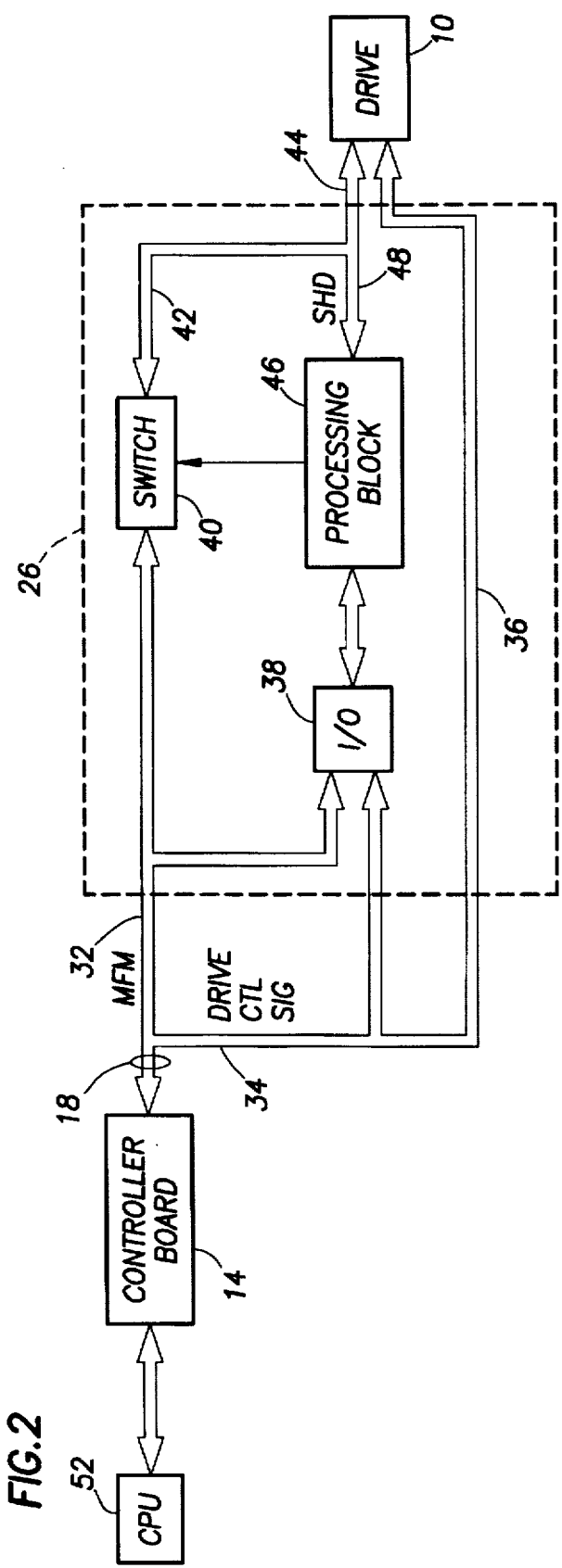
FIG. 2 illustrates an overall block diagram of the system disposed within the PC.

Referring now to FIG. 2, there is illustrated a block diagram of the conversion device 26 implemented in a PC. The cable 18 is operable to transmit data on a portion thereof in an MFM format, this being illustrated by a cable portion 32. Additionally, a cable portion 34 provides the various drive control signals that control the general mechanical operation of the drive. These are passed directly through to the drive through a bypass cable 36 and also input to an input/output (I/O) device 38, which acts as a cable interface for the converter 26. The MFM portion 32 of the bus containing the data stream is also input to the I/O device 38 and also to the input of the bypass switch 40. The switch 40 is operable to connect the MFM bus portion 32 to an output bus 42 which is connected to the drive 10. The output bus 42 is operable to carry MFM data when the drive 10 is operating in the low-density mode or in the conventional mode. The switch 40 is only closed during this time. Otherwise, the bus 42 will carry no information to the switch 40. The bus 42 is connected to an output bidirectional bus 44, which is connected to the drive 10.

A general processing block 46 is provided in the conversion device 26 which controls the switch 40 and also receives data input commands via the I/O device 38 and transfers data to the drive 10 along the bus 48 to the bus 44 to write SHD formatted data to the drive 10 and read SHD formatted data from the drive 10. When read, the SHD data is converted to MFM data and transmitted to the controller board 14 and, subsequently, up to a general CPU 52, which is the heart of the PC. The processing block on a Write operation is operable to receive MFM data from the controller board 14 and transfer this to the drive 10 as SHD formatted data.

Figure 3:
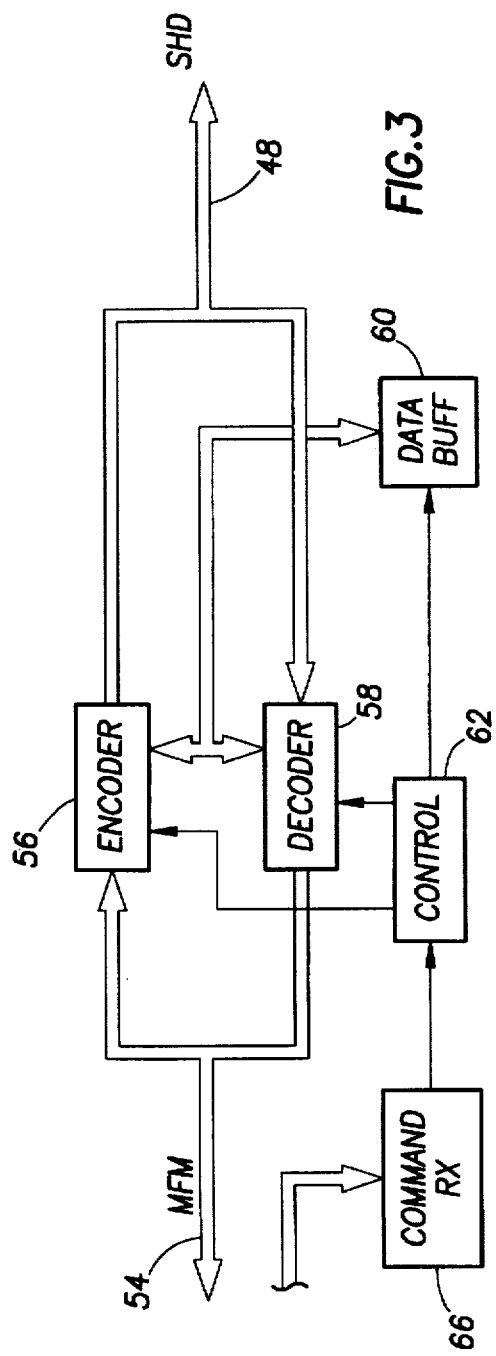
FIG. 3 illustrates a block diagram of the interface device.

Referring now to FIG. 3, there is illustrated a more detailed block diagram of the processing block 46. The I/O device 38 is operable to provide on the output thereof data to a data bus 54, which is operable to carry MFM data. During a Write operation, this is input to an encoder 56 for converting the MFM formatted data to SHD formatted data for output on the bus 48. During the Write operation, the SHD formatted data is received on the bus 48 and input to a decoder 58 and converted to MFM data and output on the bus 54. The encoder 56 and decoder 58 interface with a data buffer 60, which encoder 56, decoder 58 and data buffer 60 are controlled by a control block 62, which is an ASIC based control block 62. The control block 62 is operable to control the encoder 56 and decoder 58 such that, when data is transferred from one direction to the other, it is first stored in the data buffer 60 in a predetermined manner and then extracted in an orderly manner. It is to be appreciated that the SHD formatted data is transmitted at a much higher data rate than the MFM data, since the MFM data rate is restricted by the data rate of the controller board 14, whereas the transfer rate of the SHD formatted data is controlled by the operation of the converter 26.

In order to operate, it is necessary for the control block 62 to receive commands and instructions and also initialization parameters. Since the controller 14 was not designed originally to communicate with the drive 10 in such a manner, certain techniques have been devised to generate various commands by multiplexing the operations of various lines outside the command structure normally utilized between the controller board 14 and the drive 10 and these instructions sent to a command receiver 66 which are then input to the control block 62. This will be described in more detail hereinbelow.

Figure 4:
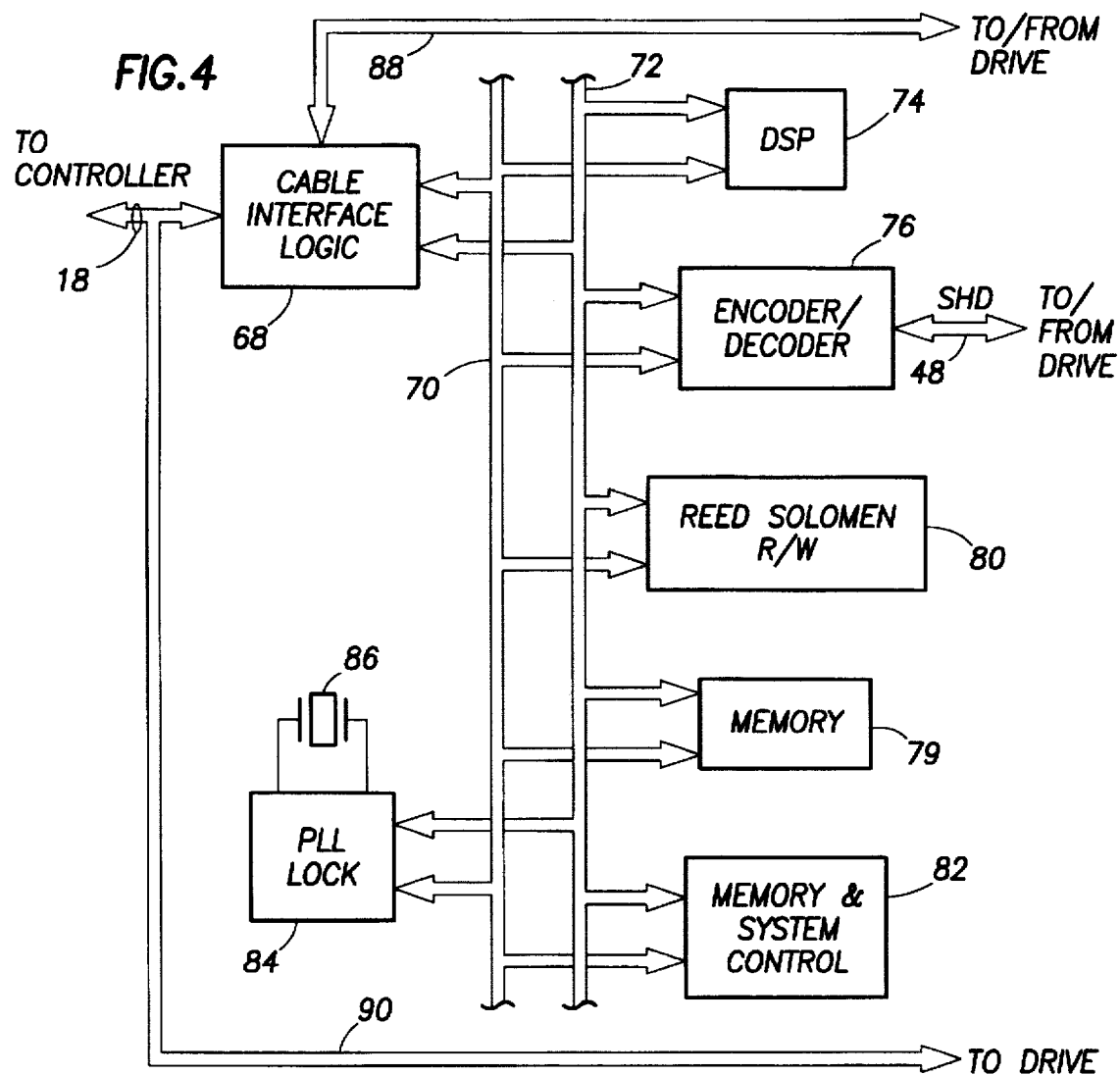
FIG. 4 illustrates a more detailed block diagram of the interface device.

Referring now to FIG. 4, there is illustrated a more detailed block diagram of the converter. The bus 18 is input to a cable interface logic device 68, which comprises the I/O device 38. The cable interface logic device 68 is operable to interface with a control bus 70 and an address/data bus 72. Although illustrated as two separate buses 48 and 54 in FIG. 3, there is in actuality only a single bus. The converter 26 is controlled by a Digital Signal Processor (DSP) 74, which is operable to process the various instructions and generate control instructions to control the entire operation of the system. An encoder/decoder block implemented with an ASIC block 76 is provided that performs the various operations of the encoder 56 and decoder 58 of FIG. 3. This is the primary interface with the drive 10 via the bus 48. As described above, this performs the operation of receiving the SHD data and placing it onto the address/data bus 72, whereas the encoder portion is operable to receive the data from the address/data bus 72 and output it as SHD data. A Program/Data memory 78 is provided which provides functions of the data buffer 60, the memory 79 operable to store data during the conversion routine, as will be described hereinbelow. Error detection and correction is provided by a Reed Solomon Error Correction Block 80 which operates in accordance with the conventional Reed Solomon Error Correction/Detection algorithm. As is typical with these algorithms, there is an additional overhead required in order to perform the various error detection and correction operations. This overhead is embedded in the data when it is transferred as SHD formatted data to the drive 10 and, upon reading the data, the data and the SHD check bytes can be examined to determine the integrity of the data. If an error is detected, this error can be corrected before formatting as MFM data. As will be described hereinbelow, MFM data has associated therewith various error detection bytes referred to as Cyclical Redundancy Check (CRC) bytes. This information is treated as data when received by the converter 26, such that the Reed Solomon overhead treats the CRC bytes as data bits within a typical data stream. When formatting the SHD formatted data to MFM data, the Reed Solomon overhead bytes are removed therefrom, since this overhead would be unrecognizable by the controller board 14.

The memory is controlled by a memory and system control ASIC 82, which controls the overall operation of the system. The timing for the system is provided by a phase lock loop clock device 84, which utilizes a crystal 86.

The cable interface logic circuit 68 is operable under the control of the memory and system control block 82 to operate in the SHD mode or in the MFM mode. In the MFM mode, the data is bypassed along a bus 88 to the drive 10. Additionally, the various drive control signals are directly input the drive via a bus portion 90, it being noted that some of these commands are input to the cable interface logic device 68 for receiving commands from the controller board 14 and the CPU 52.

Referring now to FIG. 5, there is illustrated a detailed timing diagram that illustrates the technique for increasing the amount of data that can be stored in a particular location on a magnetic media. On the top of FIG. 5, the prior art system for storing data is illustrated. In general, the drive 10 has a "bit cell" defined which is a 2000 ns window. Typically, the data is represented by a pulse 100 disposed within the bit cell. This pulse 100 is the resulting pulse that is output by the drive 10. The bit cell is determined based upon a clock signal 101 that is generated having a period equal to the width of the bit cell. The media itself actually stores information as a magnetized area in the magnetic medium. A detector is provided in the drive 10 that detects the polarity of this magnetized area wherein magnetized fields emanate from the magnetized regions. During the time that the head is disposed over a single magnetized region, the field associated with that region is more or less uniform and, therefore, no voltage develops across the coil as part of the head. When a region passes under the head in which the magnetization of the medium reverses from one polarity to the other, i.e., a flux reversal, there is a rapid change in the field, thus developing a voltage pulse. This voltage pulse corresponds to the leading edge of the pulse 100. This voltage pulse typically triggers a monostable multivibrator, which has a pulse width equal to the pulse 100. Therefore, only a single bit can be stored within the bit cell illustrated in the top portion of FIG. 5 and utilizing a conventional MFM formatting technique.

In accordance with the present invention, a Pulse Width Modulation (PWM) technique is utilized wherein a reference pulse 102 is generated at the beginning of a bit cell. The time between generation of the reference pulse 102 and the generation of the voltage pulse due to the magnetic head passing over the magnetized region defines a plurality of incremental positions within the bit cell. In the preferred embodiment, there are 33 of these. This provides decodable values of from 0 to 32. As will be described hereinbelow, a counter is initiated at the leading edge of the reference pulse 102 and is stopped when the data pulse occurs within the bit cell. For illustrative purposes, there are two pulses illustrated, a pulse 104 and a pulse 106. The pulse 104 has a leading edge 108 that constitutes a "0" digital value and the pulse 106 has a leading edge 110 which constitutes the maximum value, the value "32". Therefore, if a five-bit digital value were to be encoded, this would result in 32 values of from 0 through 31. If leading edge 108 occurred, this would correspond with the value "00000". The value 32 is a special "sync" value that does not constitute data. Therefore, there are 32 data values and one sync value provided. It can thus be seen that the density of a given bit cell is increased from a single bit of data to 5 bits of data.

Referring now to FIG. 5a, there is illustrated an alternate embodiment illustrating a duplex operation. In typical drives, the width of the output multivibrator is constant. As such, the width of pulses 104 and 106 is predefined and cannot be changed. However, hardware can be implemented to change the width of the pulse and this width can be utilized to further increase the density. In FIG. 5a, a reference pulse 112 is provided which initiates a first counter that is stopped at a leading edge 114 of a data pulse 116. As described above, the leading edge 114 is associated with the actual stored magnetic area. However, the leading edge of the data pulse 116 is utilized to initiate a second counter which is stopped at a leading edge 118 of a second pulse 120. Therefore, within a given bit cell, two data regions are stored, one at the position of the leading edge 114 and one at the position of the leading edge 118. There are two counters provided, such that the relative position of the leading edge 114 to the reference pulse, or the beginning of the bit cell, defines one set of data, i.e., up to 5 bits of data, and the relative position of the leading edge 114 and the leading edge 118 defines a second set of data, i.e., up to an additional 5 bits of data. Therefore, the relative position of the leading edge 114 to the bit cell and the relative position of the two leading edges 114 and 118 define two 5-bit data words that can be stored in a given bit cell, i.e., an addition of 9 additional bits stored in a bit cell compared to that of the conventional MFM system.

Figure 6:
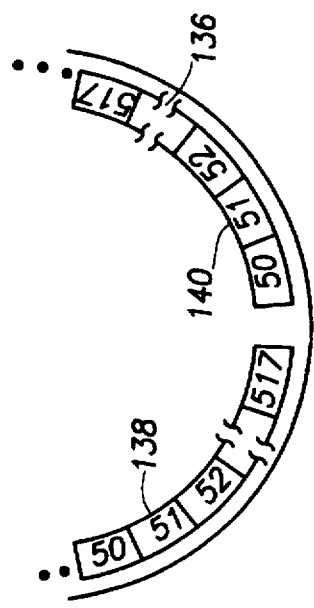
FIG. 6 illustrates a diagrammatic view of the layout of the data on a given track or cylinder on a disk.

Referring now to FIG. 6, there is illustrated a diagrammatic view of the layout of the data on a given track or cylinder on a disk 136. As will be described hereinbelow, the amount of data on a given track is increased in the SHD format, but it is presented to the controller as multiple heads. In a typical DOS system, a floppy disk is laid out with 80 tracks extending from the outer peripheral edge to the center with two sides. Each track is provided with 18 sectors. A data transfer rate of 500 Kb/sec (2 microsec per bit cell) is provided with a revolution rate of 300 rpm. As will be described in more detail hereinbelow, there are provided on each physical track of the disk 136 a plurality of pseudoheads, two pseudoheads, 138 and 140 being illustrated, with each pseudohead on that particular track having 18 sectors associated therewith. This configuration is to provide compatibility with the controller 14 as it exists in a conventional system.

Figure 7:
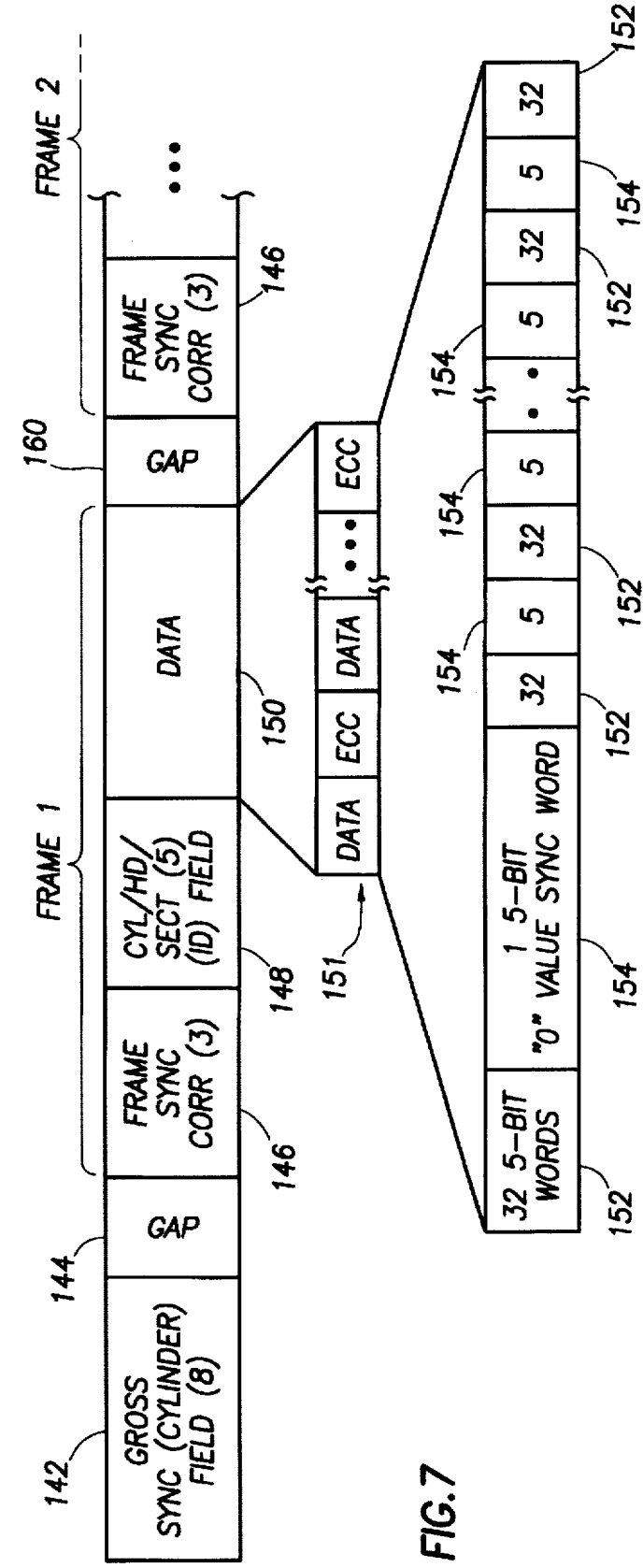
FIG. 7 illustrates a diagrammatic view of the format utilized in the super high density drive.

Referring now to FIG. 7, there is illustrated a diagrammatic view of the format for the SHD format for a given physical track. This represents only the sectors for a single head, as will be described hereinbelow. The initial head in a given track, as measured from the conventional index mark on the disk, is initiated with a gross sync field 142, which is only provided one time on a given physical track or cylinder. This is provided by eight 5-bit words having a sync value which, as described above, is a value of 32, a unique value outside of the associated 5 bit values of from 0 through 31. This sync value is recognized as dedicated to a synchronization operation, as will be described in more detail hereinbelow. After the gross sync field 142, a gap 144 is provided, the gap varying as the physical track changes. In the next field, a given frame is initiated after which a gap 160 is provided separating the next frame sync correction field 146. As described above, there are 18 DOS sectors within a frame. In the initial part of the frame, a frame sync correction field 146 is provided which is comprised of three sync values. The next field is an ID field 148, which contains the information as to the cylinder, head and sector associated with a particular DOS sector. This constitutes five 5-bit words. This field basically provides data that, when transferred back to the controller, 14 can be utilized to determine if the requested data has been received. As will be described in more detail hereinbelow, the controller is operable to receive all data on a given track, i.e., all DOS sectors for all heads on the track, and compare the information in field 148 with requested head/cylinder/sector information, and when a match is determined by comparing the data in this field 148 with a desired data set on the controller board, then the following data is extracted from the data stream coming from the drive 10. If the data stream does not contain this information in the field 148 for any of the sectors, then an error is indicated as the system has not received the appropriate sector, as it expects to from a given physical track or cylinder.

Following the ID field 148 is a data field 150. The data field is comprised of 15927 5-bit words. This field is exploded in FIG. 7 to illustrate a first level 151 showing that the data bits comprise the bits of the MFM data that form the sequence of data and ECC bits that are output in the MFM format. Thereafter, level 151 is exploded to illustrate more detail of the structure of the data field 150. The data field 150 is comprised of a plurality of subdata fields 152 and sync fields 154. Each of the subdata fields 152 contains 32 5-bit words with each sync field 154 containing one 5-bit sync word. As described above, each 5-bit word occupies a single bit cell such that there are 32 adjacent bit cells associated with each subdata field 152. The sync field 154 occupies only a single bit cell. The purpose for the interspersed sync fields 154 is to maintain synchronization, as will be described hereinbelow.

Figure 8:
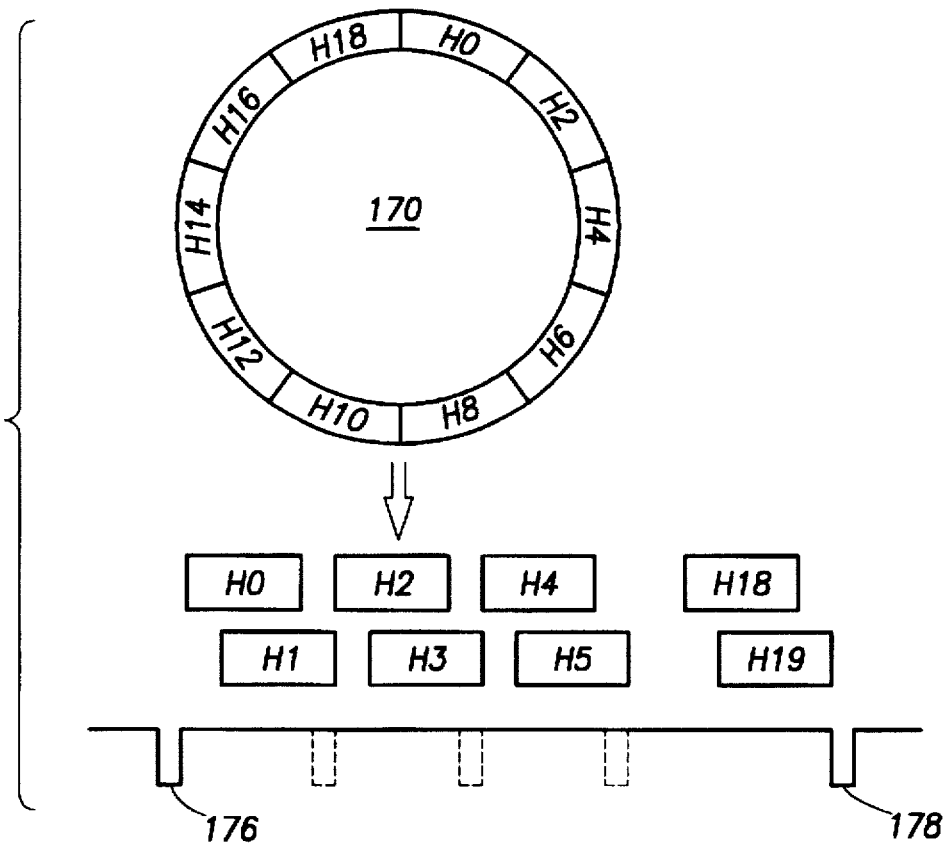
FIG. 8 illustrates a diagrammatic view of the method for implementing multiple heads in the formatting operation associated with the super high density format.

Referring now to FIG. 8, there is illustrated a detailed block diagram of the operation of the head layout. The DOS operating system is originally designed such that it would allow the definition of the number of tracks, heads and sectors to provide for 1024 tracks, 63 heads and 63 sectors.

However, DOS does not actually allow for more than 80 tracks for a given floppy drive, due to internal limitations in the operating system. However, the total number of sectors can be increased and the number of heads can be increased. The present invention takes advantage of the fact that although DOS does allow for 63 heads, the controller in actuality will only recognize two heads. Therefore, even though the ID field in a given frame indicates a head value greater than two, the controller only recognizes the LSB of the 5-bit word associated with the head designator of a given sector. Of course, there are only 18 sectors, which is consistent with a DOS system and there are only 80 tracks, which is also consistent with a DOS system. As illustrated in FIG. 8, each side of the disk has associated therewith 20 heads, 10 on each side. A disk 170 is provided wherein only the single outermost track is illustrated. There are illustrated on the one side of disk 170 the sectors associated with the heads H0, 1–12, H4, H6, H8, H10, H12, H14, H16 and H18. The sectors associated with heads H1, H3, H5 . . . H19 are disposed on the opposite side of the disk 170. These are illustrated in a stretched out manner below the disk 170 for illustrative purposes. It is noted that the heads are all set on each side. It is noted that on a given side of the disk 170, the LSB for all of the heads is the same. Therefore, the controller will ask for the odd or even heads and the absolute value thereof is not important to the actual control of the disk.

One aspect that is important about the manner in which the data is pulled off of the disk 170 is the amount of data as compared to the lower density disk. The SHD formatted disk has ten times as much data on a given cylinder or track as the lower density 1.44M floppy disk. Since the data rate to the controller 14 is maintained at 500 Kbs, even though the amount of data has increased, a longer time is required to send all data on a given track for all heads (even or odd). Since each bit occupies a bit cell of two microseconds in width, it takes a conventional floppy 147 ms to track through a single cylinder of data. Typically, the disk is allowed to extract the data twice to account for error and therefore, is allowed 300 ms. By comparison, at a data rate of 500 Kbs, it will take approximately 1.47 seconds to extract the data on a single track of the SHD floppy and pass it to the controller 14 at a 500 Kbs rate. The problem with this is that for each revolution of the disk, an index pulse is generated, this index pulse being related to a hardware indicator on the disk itself. As the data is stripped off and in the SHD format, the data will be fed from the first head encountered, followed by the second head, the third head, etc. The BIOS will store in memory on the controller information as to the requested head cylinder and sector. Of course, the cylinder has been selected by the drive and each head will have the sectors associated therewith. Therefore, for each head, the sector value read will typically match the stored sector value and the cylinder value read for that head will typically match the stored cylinder value for that head. Unfortunately, only a single head worth of data will be extracted before the index pulse again occurs. If the head value does not match that stored in the internal RAM of the controller, an error will be generated if an index pulse is generated prior to the data for the desired head being reached. For example, if data for head 5, cylinder 79, sector 10 was requested, the drive would extract data from the head having the LSB associated with the value "10" and from track 79. As the disk revolves, an index pulse would be generated and then data would be extracted from head 0, followed by head 1, followed by head 2, etc. This data would be buffered at a rate of 1 MBs and then sent to the controller at a rate of 500 Kbs. Unfortunately, the data for head 0 would be transmitted only during the time between two index pulses and then the data in head 1 would be transmitted before the next index pulse occurred. After the second index pulse occurs, an error would be indicated since the head value of "10" has not been extracted.

To prevent the error from occurring, the converter 26 of the present invention generates it own index pulse by ensuring that all heads have been read and buffered before generation of the index pulse. This is illustrated in FIG. 8, wherein a first index pulse 176 is generated, coinciding with the actual index pulse from the disk 170 with the next nine index pulses 178 generated from the disk 170 being mapped. The eleventh index pulse would then be generated. This allows all the data not only to be buffered, but to be transferred to the controller at the 500 Kbs rate.

Figure 9:
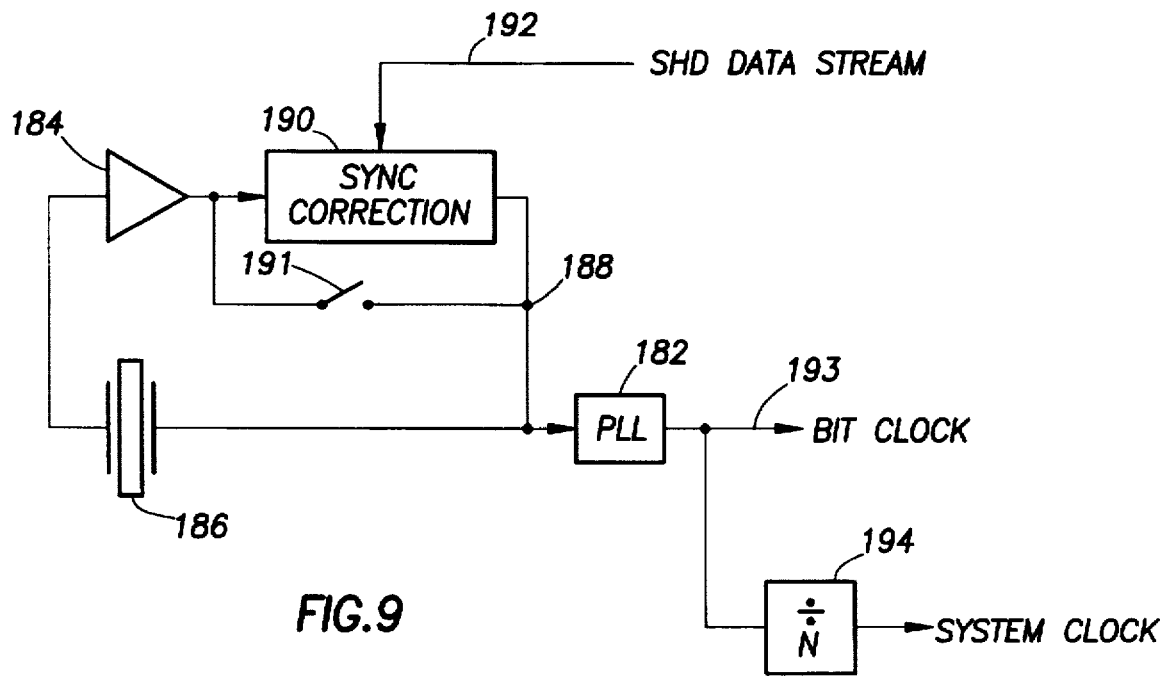
FIG. 9 illustrates a logic diagram of the clock circuit.

Referring now to FIG. 9, there is illustrated a block diagram of the clock 84. A general phase lock loop circuit 182 is provided, which operates in a conventional manner by receiving a reference value and locking an internal clock to that reference value. The reference value is a reference frequency generated by a crystal controlled oscillator comprised of an inverting amplifier 184 having a crystal 186 connected on one end to the input of the inverting amplifier 184 and on the other end to an output node 188. The output node 188 is connected in one mode through a switch 191 to the output of the amplifier 184. In this mode, the crystal provides the reference frequencies that are input to the phase lock loop 182. In this mode, the phase lock loop 182 will lock up to the phase and frequency of the crystal 186. However, in a correction mode, a sync correction block 190 is provided which is operable to receive on an input 192 the SHD data stream. As described above, there are plurality of sync values interspersed within the SHD data stream. Whenever a sync value is detected, the sync correction block 190 intersperses an "edge" into the output 188 and opens the switch 191. This edge replaces an edge in the normal crystal operation and introduces a phase error into the input waveform to the PLL 182. This phase error then "corrects" the phase and frequency of the output voltage controlled oscillator of the phase lock loop 182. This in effect "pulls" the phase lock loop to an external data synchronization stream. The phase lock loop 182 then provides on the output a bit clock on a line 193, this having a frequency range of from 1–128 MHz. A divider 194 has the input thereof connected to the bit clock line 193, the output thereof providing a system clock. The divider 194 has the ability to divide by a factor of 1, 2, 4 or 8.

Figures 10, 11:
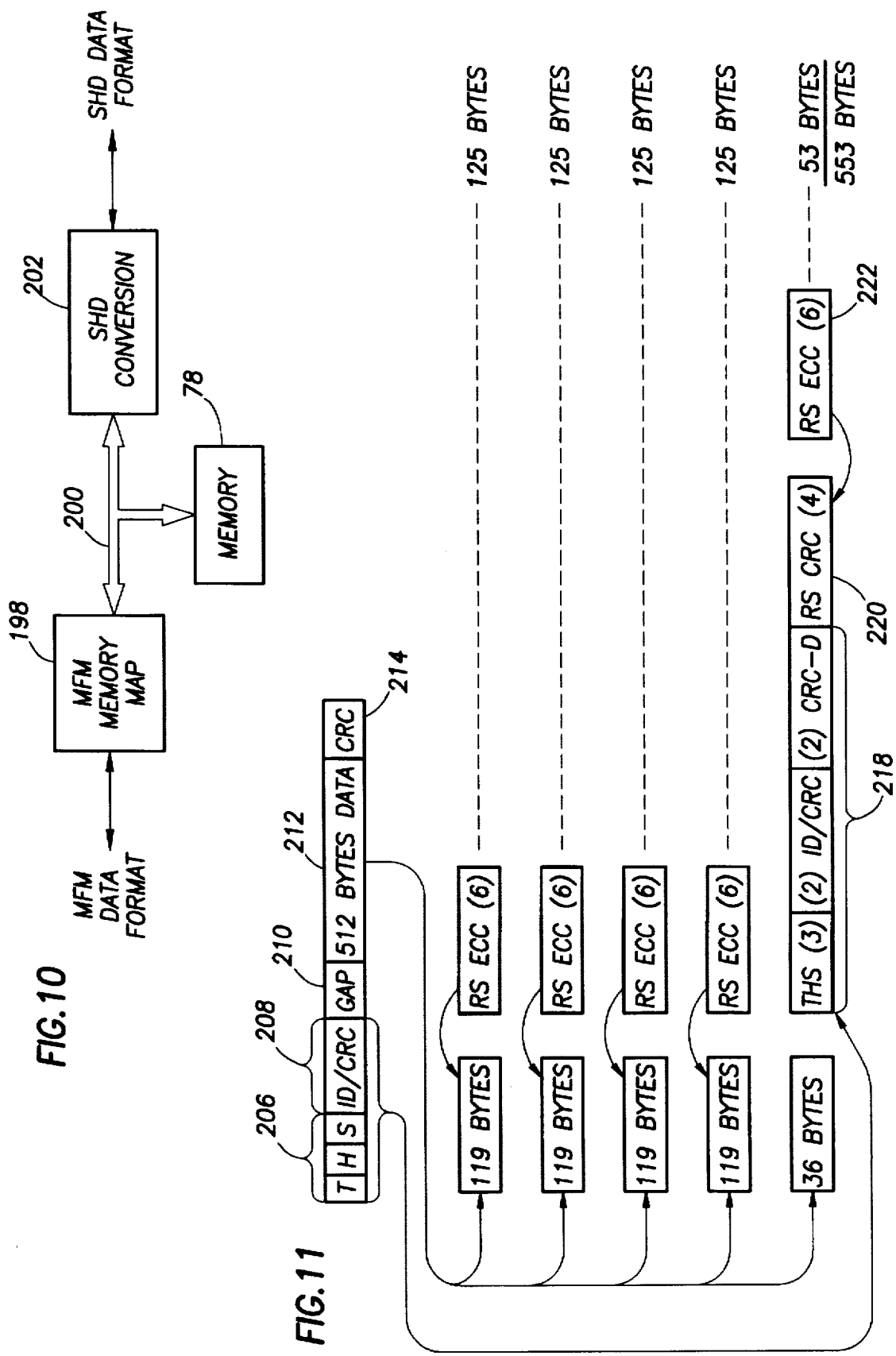
FIG. 10 illustrates a block diagram of the conversion routine for convening from an MFM data format to an SHD data format for both a Read and Write operation.
FIG. 11 illustrates a diagrammatic view of the memory layout and how the data is mapped into the memory such that it can be extracted as SHD data.

Referring now to FIG. 10, there is illustrated a block diagram of the operation of mapping the MFM data format to the SHD data format and the SHD data format to the MFM data format. The MFM data format is input to an MFM memory map block 198, the output thereof connected to a data bus 200. The data bus 200 will interface with the memory 78. An SHD conversion block 202 is operable to interface the data bus 200 with the SHD data format. In operation, MFM data is received and input to the MFM/Reed Solomon memory block 98 and then mapped into the memory 78. This data is then extracted by the SHD conversion block 202 in the SHD data format. In the reverse operation, the SHD data is received in the SHD format by the SHD conversion block 202 and then mapped into the memory 78 in suitable form such that it can be extracted by the MFM memory map 198 and output as the MFM data in the MFM data format. This operation is done in accordance with the overall memory controller operation described hereinabove.

Referring now to FIG. 11, there is illustrated a diagrammatic view of the memory layout and how the data is mapped into the memory such that it can be extracted as SHD data. Each sector of MFM data is formatted such that it has a field 206 having a track, head and sector information associated therewith, followed by a CRC field 208. This is followed by a gap 210 and then a data field 212 having 512 bytes of data. This is followed by a CRC field 214. The CRC field has 16 bits of data associated therewith. This is a standard format. First, the data field 212 is divided up into five separate fields, four fields of 119 bytes each and one field of 36 bytes. Each of the four fields of 119 bytes has 6 bytes of error correction/detection overhead associated therewith, this being facilitated with the Reed Solomon algorithm. The purpose of the field is to allow error detection when the 119 byte data field is read and assembled from the drive 10.

Each of the combined 119 bytes and 6 bytes overhead provides 125 bytes of data. The 125 bytes of data can then be represented by 200 5-bit words for storage on the disk 12. The 36 byte field of data is combined with the bytes of track/head/sector information in field 206, the ID information in the field 208 and the CRC information in field 214. This provides a field 218 that, when combined with the 36 bytes of data from data field 212, provides 43 bytes of data. A Reed Solomon CRC check byte field 220 is then generated which is four bytes long. This merely is an error detection operation. This is performed on. Thereafter, six bytes of error detection/correction overhead in a field 222 are associated with fields 218 and 220 and the 36 byte data field and all four six byte ECC fields. This provides a total of an additional 53 bytes of information for the 36 bytes of data, the field 218, the field 220 and the field 222, for a total of 553 bytes of information. This translates into 885 5-bit words that must be stored in the SHD format. This format of FIG. 11 is how the data is stored in the memory 78, such that the MFM memory map 198 transfers the MFM data format into this format for a Write operation and extracts data from this format in a Read operation.

Figure 12:
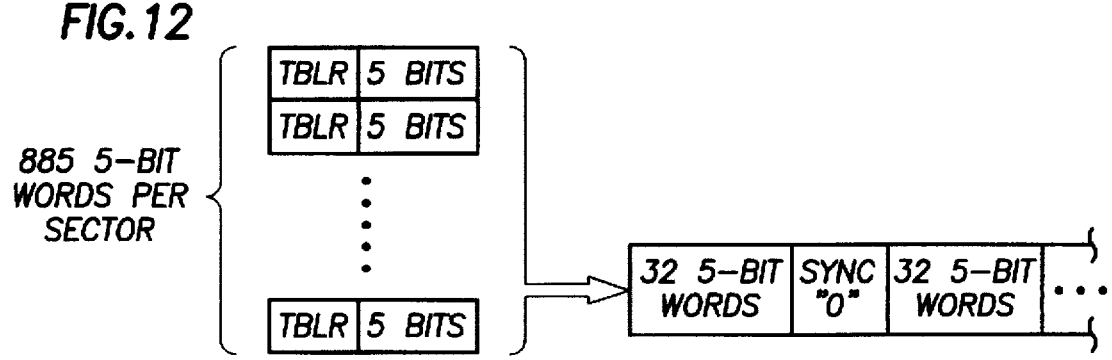
FIG. 12 illustrates the operation of converting the stored data to the actual output format.

Referring now to FIG. 12, there is illustrated a diagrammatic view of the technique for transferring the data from the memory 78 in the format illustrated in FIG. 11 to the SHD format data stream. A Read operation is performed by the DSP, which is referred to as LACK operation. Whenever this operation is executed, five bits of information from a sequential program counter address placed onto the bus 200 and then output to the SHD data line. This is a sequential or pipelined operation, as will be described hereinbelow. The data is sequentially output from the memory 78 in 5-bit increments, these 5-bit increments then assembled as 5-bit words. The 5-bit words are then utilized to operate a counter for determining the relative position of the data pulse in time to the reference pulse for each bit cell, i.e., the pulse width modulation. By first arranging the MFM data into a serial stream of bits and then segmenting the bits into 5-bit segments, the 5-bit segments will constitute a word, which can be utilized to determine the position of the pulse from the bit cell.

In the Read operation, the time between the reference pulse and the data pulse is utilized to start and stop a counter, with the count value when the counter is stopped indicating the value of the 5-bit word. This value is then converted to a 5-bit word and these 5 bits stored in the memory 78 in accordance with the format described above with respect to FIG. 11. This is then mapped back into the MFM data format.

Figure 13:
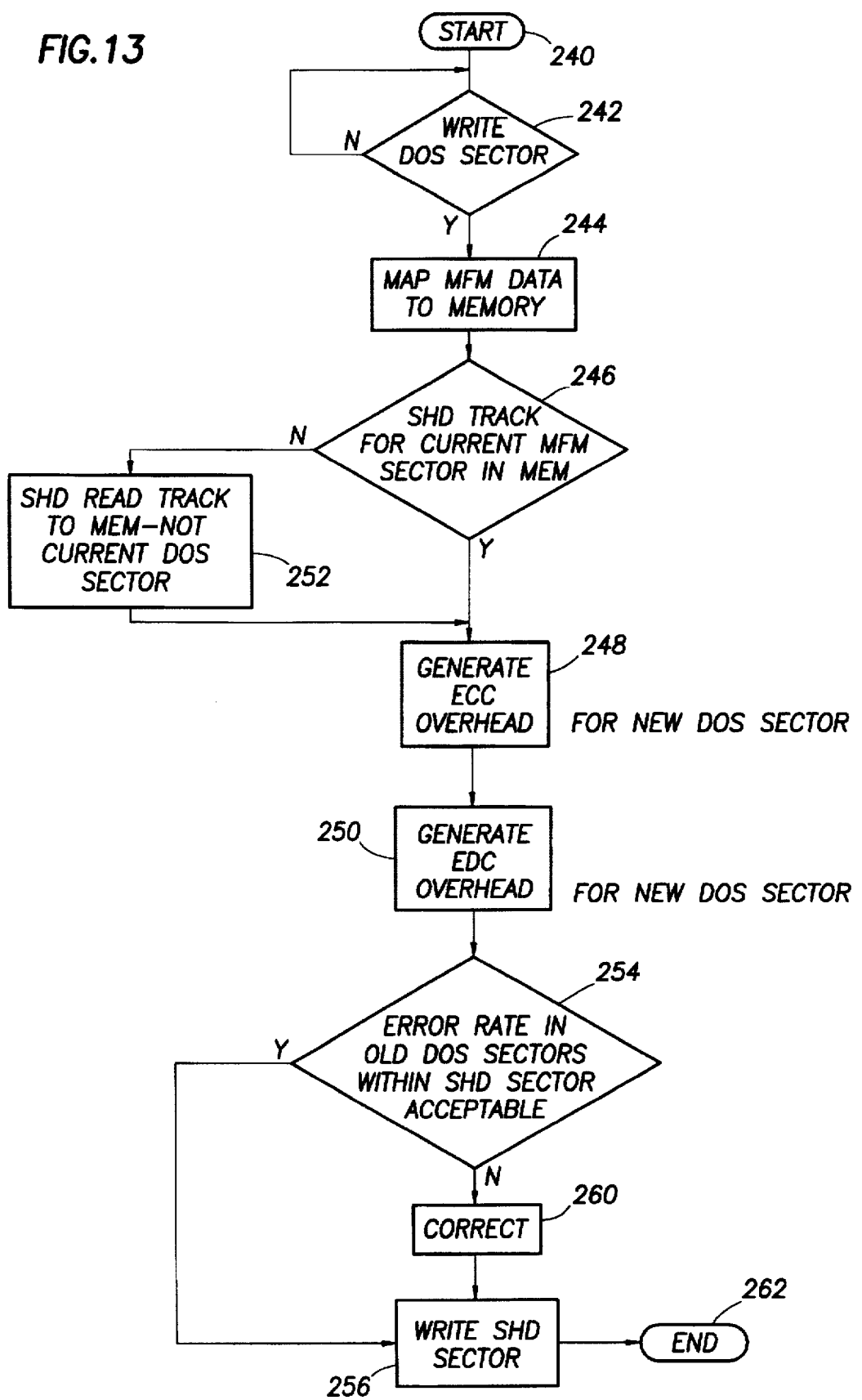
FIG. 13 illustrates a flowchart for the Write operation.

Referring now to FIG. 13, there is illustrated a flow chart depicting the overall Write operation. The program is initiated at a start block 240 and then proceeds to a decision block 242 to determine if a DOS sector is to be written. As described above, the CPU 52 in conjunction with the controller board 14, does not realize that an SHD drive is emulated and, therefore, it will write a DOS sector as if it were a 1.44M conventional high density drive. Therefore, it will tend to write a DOS sector to a given track using a given head at a given sector, it being remembered that DOS provides for 18 sectors for the given head. If the system is not in a Write mode, the program will proceed along an "END" path back to the input of the decision block 242. When a Write operation is to be performed, the program will flow from the decision block 242 along a "Y" path to a function block 244 to then map the MFM data to the memory 78, as described above with respect to FIG. 11. The program will then flow to a decision block 246 to determine if the current MFM sector is stored in memory. As described above, each SHD track contains the information for multiple DOS sectors in the MFM format. For example, one implementation utilizing 20 heads implements 10 heads on each side by disposing the information from the 10 DOS heads on a single side of the disk. During a Read operation, all the information for a given SHD track is stored in memory, such that an overall ECC overhead can be associated with the entire SHD track, this being for multiple sectors. Therefore, if the current SHD track is in memory, it is only necessary to replace the DOS sector within that SHD track for the assigned head. In this situation, the program will merely flow along the "Y" path from the decision block 246 to a function block 248 to generate the error correction code (ECC) for the new DOS sector and then to a function block 250 to generate the error detection code (EDC) overhead for the new DOS sector. However, if the SHD track for the current MFM sector was not stored in memory, the program would flow along the "N" path from the decision block 246 to a function block 252. In this mode, the system would go to the drive 10 and read the entire SHD track to the memory without reading the current DOS sector, since the current DOS sector already exists in memory as it was mapped to the memory in the function block 244. This is also the case with the Write operation wherein the SHD track current MFM sector was already stored in memory. The mapping operation of function block 244 merely inserts or maps a DOS sector into the appropriate location in memory.

Figure 14:
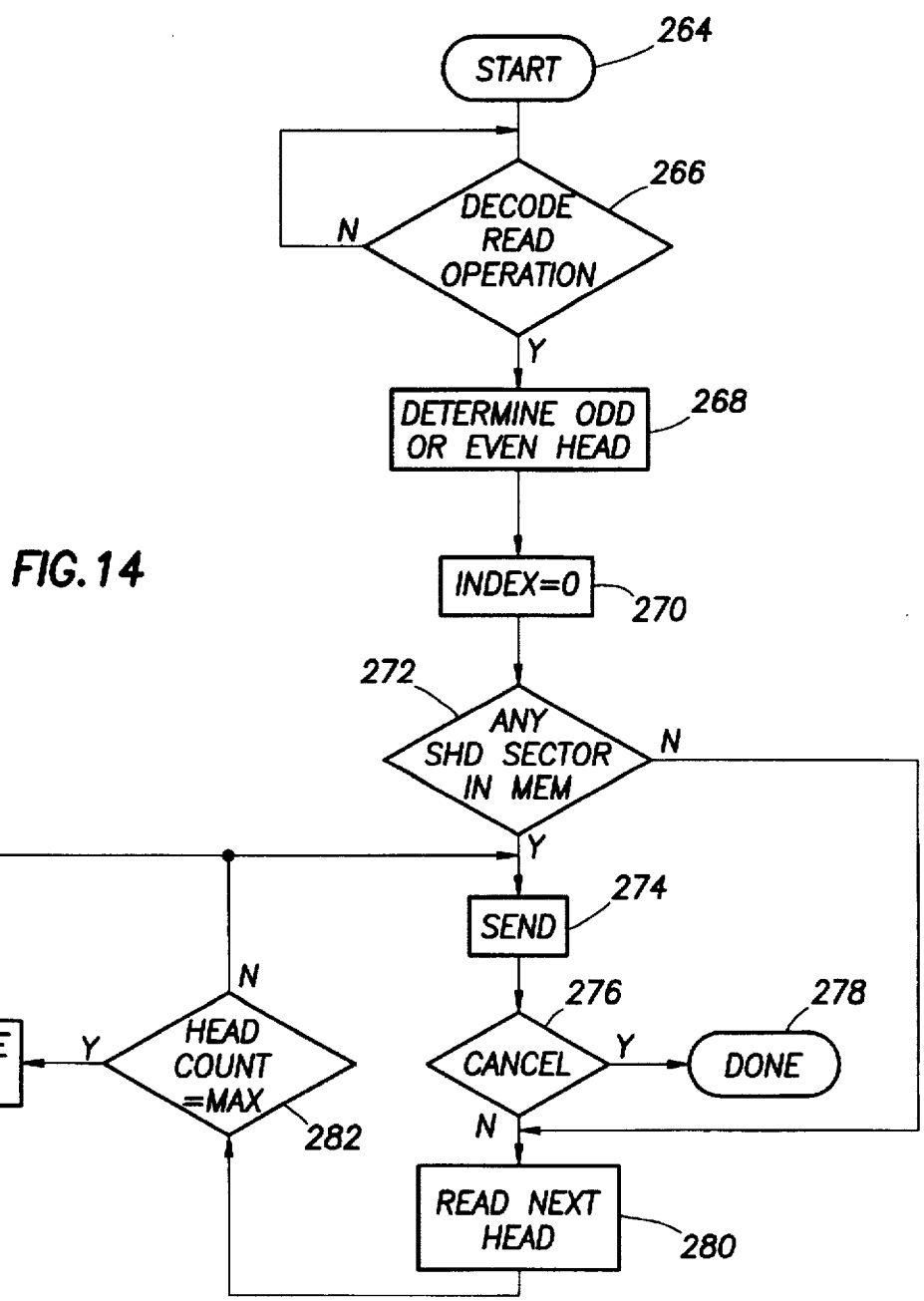
FIG. 14 illustrates a flowchart for the Read operation.

After the ECC and EDC overhead have been generated for the new DOS sector, the program will flow to a decision block 254 to determine the error rate in the old DOS sectors within the currently stored SHD sector and compare it with a threshold. If the error rate is acceptable, i.e., whether it can be corrected, then the program will flow along a "Y" path to a function block 256 to write the SHD sector, it being noted that the SHD sector includes multiple DOS sectors, one from each head on the particular side that it is being written to. However, if the error rate in the old DOS sectors is not acceptable, the program will flow along the "N" path to a correction function block 260 wherein the errors will be corrected and then the program will flow to the function block 256. The program flows from the function block 256 to an END function block 262. However, if the errors cannot be corrected, an error will be generated. Referring now to FIG. 14, there is illustrated a flow chart for the READ operation, which is initiated at a start block 264 and then flows to a decision block 266 to wait for a Read operation to be decoded. The program will maintain itself in a loop along an "N" path back to the input of decision block 266 until a Read operation is initiated. At this point, the program will flow along the "Y" path to a function block 268 to determine whether the head is an odd or even head. As described above, the software is manipulated to send head information to the controller board 14 indicating a select one of 20 heads. This is stored in the controller board and then the controller board merely looks at the LSB of the value for the head that is stored therein and utilizes this to select a head on drive 10. Once it is determined whether the head is odd or even, the program flows to a function block 270 to set the index equal to a value of "0". The program then flows to a decision block 272 to determine if there is any SHD sector stored in the memory. If so, the program will flow along a "Y" path to a function block 274 to send this SHD sector to the controller board as MFM data, such that the controller board can determine if a desired DOS sector is embedded within this SHD sector. It should be remembered that this SHD sector includes all DOS sectors for all heads having the determined odd or even value. The program then flows to a decision block 276 to determine if the operation has been cancelled. If so, the program flows along a "Y" path to a Done block 278 and, if a CANCEL operation has been initiated, the program flows along an "N" path to a function block 280 to read the next head value stored in memory. The program then flows to a decision block 282 to determine if the head count is equal to a maximum number. If so, the program will flow along a "Y" path to a function block 284 to generate the index pulse. As described above, this is the operation wherein even though an actual index pulse was generated from the disk due to the disk revolving at least one time, this index is masked and not set until the program is directed to a function block 284.

When the head count is not equal to a maximum number, this indicates that an index pulse should not be sent. The program will then flow along an "N" path from decision block 282 back to the input of function block 274 to send the next DOS sector for the next head. This will continue until the index pulse is generated and an error occurs due to the fact that the controller has not yet received the requested DOS sector or that the DOS sector has been received and this information sent back to the system. If the SHD sector was not stored in the memory, as determined by decision block 272, the program would then flow along the "N" path directly to the input of the function block 280 in order to read the next head from the disk.

Referring now to FIG. 15, them is illustrated a block diagram depicting a method for initially loading the conversion device 26 with program information, etc. Although the conversion device 26 could be manufactured with all program information loaded in a nonvolatile memory, it is more preferable to provide memory space within the conversion device 26 to allow it to be reconfigurable. Of course, this requires some type of communication path to allow data to be transmitted to the conversion device 26. Since the conversion device 26 must be inserted in series with the controller cable, and there is typically no provision for communicating commands to the drive, other than various drive control commands, it is necessary to utilize the various existing lines for communication with the conversion device 26.

In a typical controller board, there are two registers, a Digital Output Register (DOR) 290 and a Digital Input Register (DIR) 292. The DOR 290 is connected to a portion of the disk controller cable, labelled with reference numeral 294, which cable portion 294 is operable to provide various disk drive control commands, such as the motor enable commands and the drive select commands. There are four drive commands that are of interest, the Motor Enable Command MEB-Bar, a Motor Enable command MEA-Bar, a Drive Select command DSB-Bar and Drive Select command DSA-Bar. In general, there are only three valid combinations of the signals for controlling the drive, one when all signals are high, one when DSB and MEB are low and the other one when for the MEB and MEA signals. However, if the combination of MEB, MEA, DSB and DSA is looked at as a four-bit word, this constitutes only three combinations, such that 13 combinations remain that will not be recognized by the drive. As such, these combinations can be utilized to transfer commands to the conversion device 26. Therefore, as illustrated in FIG. 15, the bus portion 294 with the commands associated therewith are input to the conversion device 26 to a command interpreter 298, which is operable to decode the various commands therefrom. These commands are then input to the DSP 74. Additionally, the bus portion 294 is also input to both the main drive 10, which is referred to as "Drive A" and also to a secondary drive 300, referred to as "Drive B."

In order to transfer information back to the controller board 14, the conversion device 26 makes use of a disk change line 302 which is utilized to provide a single bit to the DIR 292. This single bit is utilized, as will be described hereinbelow, to transfer a serial data stream to the CPU via the DIR 292.

Referring now to FIG. 15b, there is illustrated a timing diagram depicting the communication protocol. In general, the clock in the system, i.e., the PC, allows 100 microsecond intervals to be accurately detected. Therefore, it is only necessary to utilize increments of 100 microseconds in order to determine the length of a pulse. As illustrated, a logic "0" can be represented by the signal CLK0, as represented by the signal when it is pulled low for 100 microseconds and then raised high for 100 microseconds. A logic "1", represented by the CLK1, is represented whenever the signal is pulled low for 200 microseconds and then raised high for 100 microseconds. A signal is indicated at the end of a bit stream is represented whenever the signal in the disk change line is pulled low for 300 microseconds and then pulled high for 100 microseconds. An End of Message signal is represented whenever the disk change line is pulled low for 400 microseconds and raised high for 100 microseconds. A message of three bits length having the bits "001" is represented in a single word, which is represented by 2 CLK0 signals and one CLK1 signal followed by an "ENDBITS" message.

Figure 16:
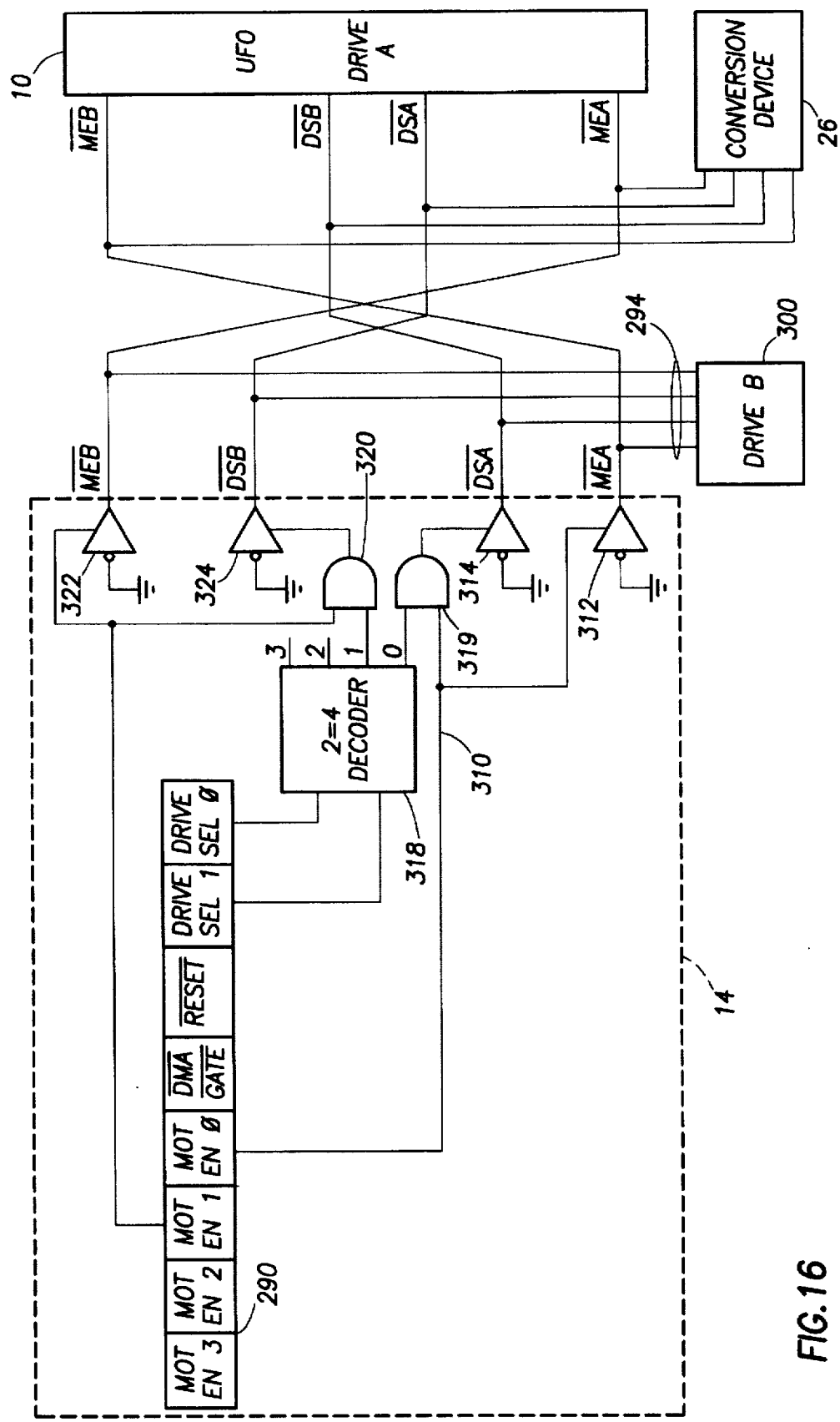
FIG. 16 illustrates a block diagram of the portion of the floppy disk controller associated with the digital output register (DOR)

Referring now to FIG. 16, there is illustrated a detailed schematic diagram of a typical floppy disk controller DOR and the logic circuitry for interfacing the DOR with the control bus. A floppy disk controller 14 has the control bus connected to the drive 10 and also to the drive 300 via the bus 294. The manner in which the bus 294 distinguishes between the drive 10 and the drive 300 is via a "twist" in the cable, wherein the DSA, DSB and MEA, MEB signals are reversed.

The DOR 290 has four motor enable signals, MOT EN0, MOT EN1, MOT EN2 and MOT EN3, a DMA GATE signal, a RESET signal and two Drive Select signals, SEL1 and SEL0. The MOT EN0 signal is output to a line 310, which is input to one input of an AND gate 319 and also to the control input of a driver gate 312, gate 312 having the input thereof connected through an inverting node to ground, such that it acts as an inverter. The output of the gate 312 comprises the MEA-Bar signal. The gate 319 therefore comprises a driver. The output of AND gate 312 is connected to the control input of a driver gate 314, the input thereof inverted and connected to ground and the output thereof providing the DSA-Bar signal. The other input of AND gate 319 is connected to the "0" output of a 2:4 decoder 318. Decoder 318 has the two inputs thereof respectively connected to the SEL1 and SEL0 output registers of the DOR 290. The "1" output of the decoder 318 is connected to one input of an AND gate 320, the other input thereof connected to the MOT EN1 signal. The MOT EN1 signal is also connected to the control input of a driver gate 322, the input thereof connected through an inverting input to ground and the output thereof comprising the MEB-Bar signal. The AND gate 320 has the output thereof connected to a driver gate 324, the input thereof connected through an inverting input to ground and the output thereof comprising the DSB-Bar signal.

The signals MEB-Bar, DSB-Bar, DSA-Bar and MEA-Bar signals output from the gates 322, 324, 314 and 312, respectively, are directly input to the drive 300. However, the drive 10 has the MEB-Bar signal connected to the MEA-Bar input, the MEA-Bar signal input to the MEB-Bar input, the DSB-Bar output connected to the DSA-Bar input and the DSA-Bar output connected to the DSB-Bar input. This, again, is a conventional interconnection. As will be described hereinbelow, the input signals to the drive 10 for input to the conversion device 26 and are utilized for the purpose of generating commands. If the commands are valid commands, they are utilized by the drive 10 for control thereof. If they are invalid commands, the drive ignores them. It will be noted that these are input directly to the drive 10 and also to the conversion device 26.

The loader operation, as described above, is an operation whereby a plurality of special commands are generated which constitute values loaded in the DOR that generate commands on the bus 294 for the drive control lines that are invalid or not recognizable commands. These commands are illustrated in TABLE 1.

The program will then flow to a function block 364 to reset the conversion device 26 by sending a reset command. The program will then flow to a function block 366 to download the DSP binary image to the conversion device in the particular location in memory that is referred to as BANK0 by using the defined commands from block 360. This generally is the CRC data. The program then flows to a function block 370 to send the Drive Select command and then to a function block 372 to send the RUN command. The check byte information stored in the memory is then read from BANK0, as indicated by function block 374, which is the operation wherein the information from the status line is read into the DIR and utilized to receive the CRC bits back from the conversion device 26. The program then flows to a decision block 376 wherein the received CRC information is compared with the stored CRC information to determine if they compare, i.e., whether the data received at the conversion device had any errors in it. If the CRC is not correct, the program flows along the "N" path back to the input of the block 364 to reset the conversion device 26 and resend the information. However, if the information was accurately sent, the program will flow along the "Y" path from decision block 376 to a Termination block 384 to display a status message to the user and then return to a DOS prompt.

Figure 18:
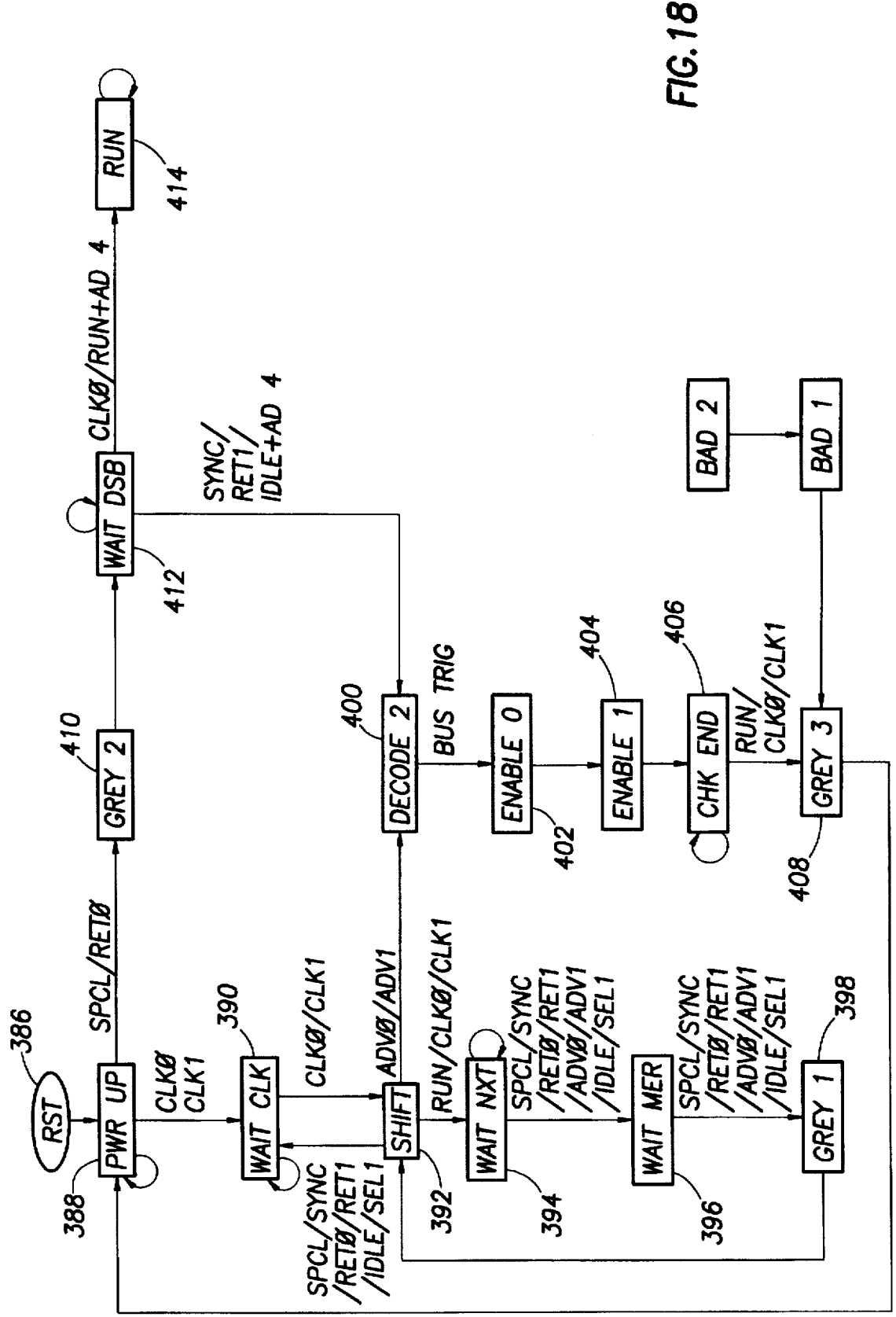
FIG. 18 illustrates a state diagram implemented in the ASIC that is associated with the loading operation.

Referring now to FIG. 18, there is illustrated a state diagram that depicts the operation in the conversion device 26 and the portion of the ASIC device associated with the loading operation and the communication operation. The diagram is initiated at a Reset block 386 which represents a reset operation for the part and then to a power-up block 388 indicating the power-up state. At the power-up state, the system will enter a Wait loop until the code for CLK0 or CLK1 is received, indicating transmission of data. Or, the

TABLE 1

|  | LOADER DEFINITION (DOR) | | | | | CONTROLLER OUTPUT | | | |
|---|---|---|---|---|---|---|---|---|---|
|  | | | | | | MEB- | MEA- | DSB- | DSA- |
|  | MEB | MEA | | | SEL1 | SEL0 | BAR | BAR | BAR | BAR |
| RST | 0 | 0 | 1 | 1 | 1 | 1 | 0 | 1 | 0 | 0 | 0 | 1 |
| SPCL | 0 | 0 | 1 | 0 | 1 | 1 | 1 | 0 | 0 | 1 | 1 | 1 |
| SYNC | 0 | 0 | 0 | 0 | 1 | 1 | 1 | 1 | 1 | 1 | 1 | 1 |
| RUN | 0 | 0 | 1 | 1 | 1 | 1 | 1 | 0 | 0 | 0 | 1 | 1 |
| CLK0 | 0 | 0 | 1 | 1 | 1 | 1 | 1 | 0 | 0 | 0 | 1 | 1 |
| CLK1 | 0 | 0 | 0 | 1 | 1 | 1 | 1 | 0 | 1 | 0 | 1 | 1 |
| RET0 | 0 | 0 | 1 | 0 | 1 | 1 | 1 | 1 | 0 | 1 | 1 | 1 |
| RET1 | 0 | 0 | 0 | 0 | 1 | 1 | 1 | 1 | 1 | 1 | 1 | 1 |
| ADV0 | 0 | 0 | 1 | 1 | 1 | 1 | 0 | 0 | 0 | 0 | 1 | 0 |
| ADV1 | 0 | 0 | 0 | 1 | 1 | 1 | 0 | 0 | 1 | 1 | 0 | 0 |
| IDLE | 0 | 0 | 0 | 0 | 1 | 1 | 1 | 1 | 1 | 1 | 1 | 1 |
| SEL1 | 0 | 0 | 1 | 0 | 1 | 1 | 0 | 1 | 0 | 1 | 0 | 1 |

It can be seen that in TABLE 1, the values for MOT EN3 and MOT EN2 are a "0" value and the value for the DMA GATE and RESET signal are equal to "1". The outputs from the controller 14 are also illustrated, it being noted that the values for drive 10 constitute the reverse of the controller output, due to the twisted wire configuration. It can be seen that some of the commands are repetitive, i.e, they have the same values. The system utilizes the commands that results in the desired command, as will be described hereinbelow.

Figure 17:
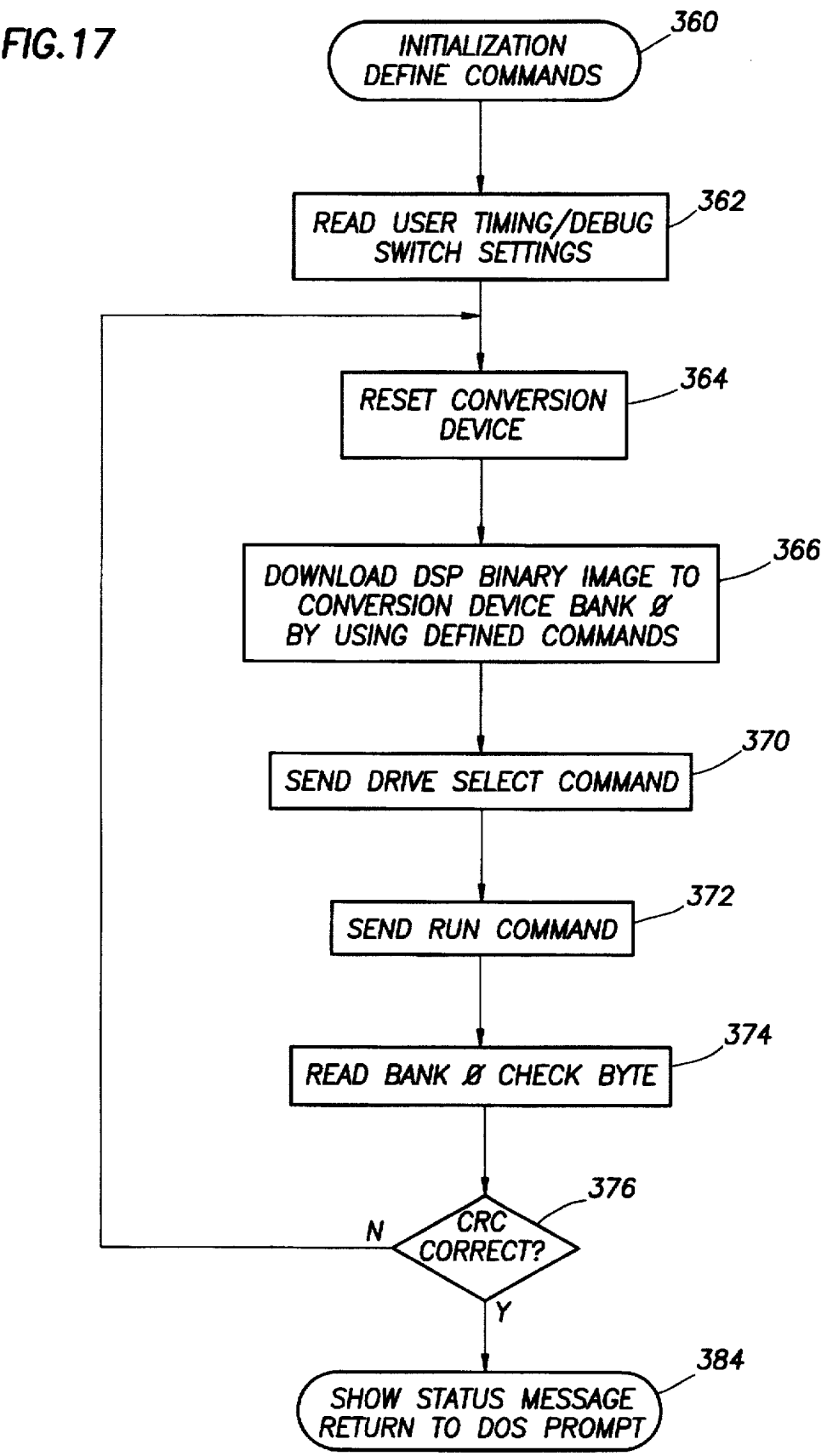
FIG. 17 illustrates a flowchart for the loader operation.

Referring now to FIG. 17, there is illustrated a flow chart depicting the loader operation. The program is initiated at a block 360 which defines the step of initializing the system and defining the various commands. Once the commands are defined, the program flows to a function block 362 where the system reads the various user timing/debug switch settings.

SPCL command followed by the RET0 command is received. When the CLK0 or CLK1 signal is received, the system flows to a wait block 390, after which it will move to a shift state block 392, upon receiving either a CLK0 command or a CLK1 command. Whenever a RUN/CLK0/CLK1 signal is received, indicating receipt of one of these commands, the program will flow to a Wait state block 394 to wait for the next command which can be a combination of a SPCL/SYNC command or other commands, such as RETx, ADVx or IDLE/SEL1. The system will continue to wait for and process commands through a plurality of blocks 396 and 398 to process the various commands and then will cycle back the shift state block 392 and continually process data, as will be described hereinbelow. This will continue until either a SPCL/SYNC signal is received at the shift state block 392, which returns it to the Wait state block 390 or an ADV0/ADV1 sequence is received. This will route it to the Decode 2 state block 400. This proceeds through a plurality of Enable states, 402 and 404. This then goes to a block 406 to wait for the END state which is a sequence of a RUN command or a CLK0 or CLK1 command and then proceeds to a state 408. The state 408 will then feed back into the power-up state 388. Additionally, if the power-up state is directed to an intermediate state block 410 which would go to a Wait state block 412, this would either route the operation to the decode block 400 or to the RUN block 414. The RUN block 414 is advanced to by receiving a CLK0 followed by a RUN command at the block 412. The decode block 400 is arrived at by the SYNC command followed by a FRET1 command and IDLE command.

Figure 19A:
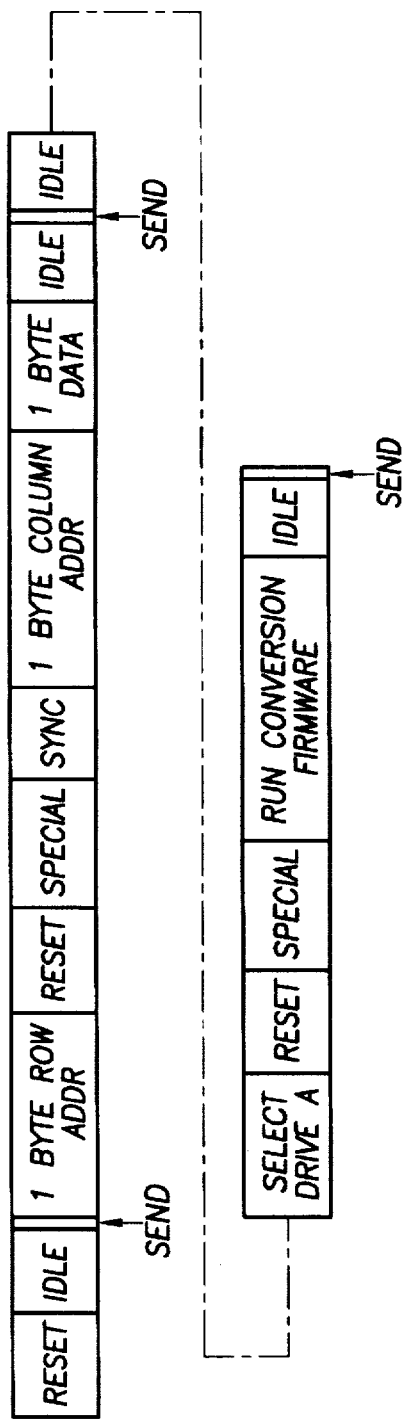
FIGS. 19a and 19b illustrate an example of the loading operation.

Referring now to FIG. 19a, there is illustrated one example of a loading operation wherein the row address "07" and the column address "21" is accessed and the data value F4 is loaded. This is represented by the bit stream "0000011100100001" for the address, and "11110100" for the data. In this example, the RESET command is first sent followed by the IDLE command and then a small wait time for sending data back to the controller is arrived at. This is followed by transmission of the one byte row address followed by a RESET signal, a Special signal SPCL and then a SYNC signal. After the SYNC signal, a one byte column address is transmitted followed by the one byte data value. This is followed by an IDLE command. This is followed by another IDLE command and then by the Select Drive A signal. The Select Drive A signal is followed by a RESET signal and then a special signal SPCL, and then the RUN command for running the conversion firmware is then sent. This is followed by an IDLE signal and then another send space signal. Again, this is just one operation for sending a single data value down to the conversion device 26.

Also illustrated is a send space which periodically occurs within the sequence of commands. This send space indicates that the signals are typically buffered and sent at a single time such that they are all sent in a continuous stream.

Figure 19B:
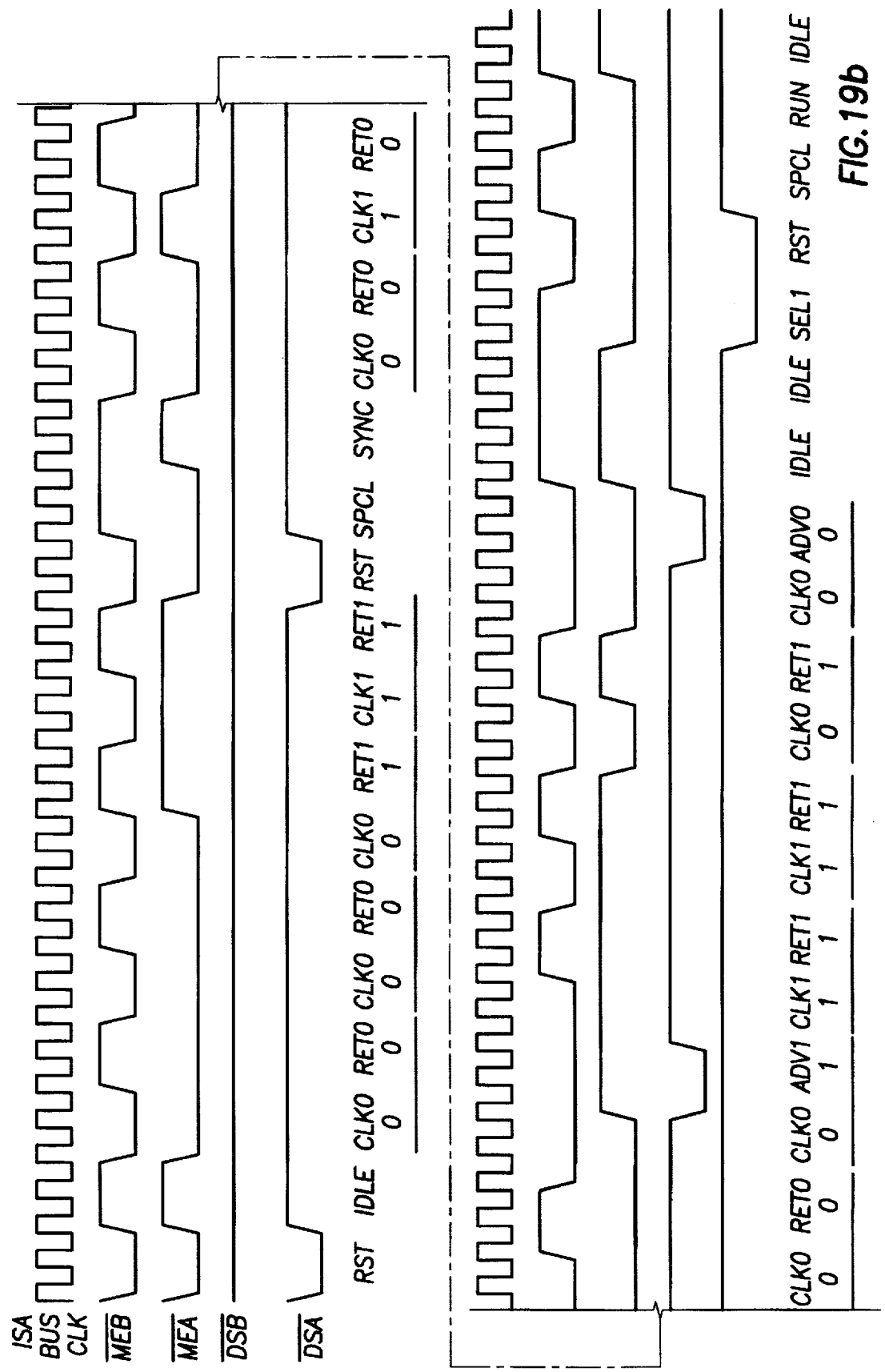

Referring now to FIG. 19b, there is illustrated a timing diagram depicting the generation of the commands via the disk control lines. There is illustrated a waveform for the bus block and waveforms for the MEB-Bar signal, the MEA-Bar signal, the DSB-Bar and the DSA-Bar signals. It can be seen that the RST command and the IDLE command are the first two commands that are sent followed by the send space. Timing information will be forwarded back to the controller board during this time, as will be described in more detail hereinbelow. This is then followed by the one byte row address. In order to send the one byte row address of the "00000111", data is sent by sequencing the CLKx and RETX commands. For example, a value of "0" followed by a value of "0" is represented by a CLK0 command followed by a RET0 command. A "1" value followed by a "1" value is represented by a CLK1 value followed by a RET1 command. Similarly, a "0" value followed by a "1" value is represented by a CLK0 command followed by a RET1 command.

After the one byte row address is sent, this is followed by a reset command, and then the sequence of the SPCL and then the SYNC commands. The one byte column address is then sent in a similar manner to the one byte row address with the exception that the last two bits are sent with the sequence of CLK0 command followed by the ADV1 command the ADV1 command indicates that another byte of data is to be sent. This is the one byte data value which is sent similar to the previous data to form the address word, the last two bits represented by the CLK0 and ADV0, representing the value "00". This is followed by the IDLE command, information as to the timing being sent back to the controller and another IDLE command. Thereafter, the select command SEL1 is followed by a RESET command RST and then the Run sequence of the SPCL command followed by a RUN command.

Referring now to FIG. 20, there is illustrated a diagrammatic view of the memory 79. The memory 79 is comprised of a Dynamic Random Access Memory wherein a plurality of rows and columns are provided with the memory cells arranged along the rows and columns. Each row of memory elements is divided up into eight banks, BANK0–BANK7. Of these banks, six of the first seven, BANK1–BANK6, are utilized for data and the remaining bank, BANK7, is utilized for the Reed/Solomon error detection/correction operation. A memory control block 450 is provided which provides control for the memory 79. In general, the memory control 450 is operable to provide the row and column selection operation and also the various control operations to process data therefrom.

In general, the memory control 450 is operable to access a row of cells during a memory access cycle. This is an operation whereby a single word line is addressed via an address input to the memory 79 which is then decoded and then the appropriate addressed one of the word lines driven "high". Each of the word lines is connected to the gates of memory cell selection transistors that are then operable to connect the plate of the memory cell capacitor to a data line or a column line. Therefore, this data line then operates in conjunction with the sense amplifier to latch the data value of the memory cell onto the data line or column line.

Each of the banks comprises eight column lines, these column lines operable to be selected through a column line decoder such that only a single bank of data is output to the data buses 72. This is illustrated with a bank decode block 452. Therefore, once a row of memory cells is selected, the bank decode 452 can then determine which of the groups of memory cells in which of the banks is to be output. As will be described hereinbelow, the memory access cycle takes a predetermined amount of time due to the fact that certain precharge operations are required in addition to the amount of time to actually access the memory cell and then latch it onto the data line. This could be time consuming if a separate row access was required for each access to the memory. As will be described hereinbelow, a level of efficiency is achieved by accessing one row of memory cells and then sequentially accessing the data on the different column lines associated with the different banks.

In one method of reading output codes, instructions are executed such that each sequential instruction results in data being transferred from the memory 79 onto the data bus 72. This is achieved through what is referred to as "Table Read" operation which has associated therewith the instruction "TBLR". The TBLR instruction is a DSP instruction that reads data from memory onto the data bus for storage in a DSP storage register. The DSP storage register is a register in the DSP 74. The purpose of the TBLR instruction is to transfer data from memory 79 to the DSP register in DSP 74. As will be described hereinbelow, the register in which it is stored in the DSP 74 during a Write operation is not important. Rather, it is only important that the data be read from memory 79 through the data bus 72 in order for it to be input to the counter, as will be described hereinabove. The TBLR DSP instruction is an indirect instruction that reads a location in the memory defined in an accumulator register. Therefore, the accumulator contains a pointer to the specific memory location and this memory location is what is read in the TBLR instruction. The TBLR instruction bears a hexadecimal code "67", which occupies the high byte portion of the memory with the low byte portion containing the lower bit portion of the DSP register, and the direct/ indirect method of destination register access.

Referring now to FIG. 21, there is illustrated a diagrammatic view of the transfer of data. The DSP 74 provides seven registers labelled BANK0, BANK1, ... BANK6, each corresponding to one of the banks of the memory 79. Consider the following sequence of instructions:

LACK 100
TBLR BANK0

The above instructions provide an operation wherein the accumulator is first loaded with the value "100", which indicates a row location. The second instruction indicates that a Read operation is to be performed on Location 100 from Bank 0 and it is to Write the information stored in row 100 in Bank 0 into the register Bank 0 in the DSP. Of course, the registers in the DSP are utilized for nothing more than scratchpad storage and the information in this is actually not used. Rather, it is the transfer of data and the existence of this data on the bus that is important. Consider the operation:

ZAC
TBLR BANK0
ADD_ONE
TBLR BANK0
ADD_ONE
TBLR BANK0
TBLR BANK0

In this operation, the accumulator is first zeroed and then a table read performed on the first bank of memory. Wherein, a table read is performed on the first bank of memory cells and at the first location and then the location incremented to the first row of memory cells. In general, a table read instruction takes three instruction cycles, whereas an add operation takes a single cycle. This, therefore, requires four cycles for each Read operation. This therefore accesses a single bank of memory cells by incrementing the memory location or the row location. An alternate embodiment is as follows:

ZAC
TBLR BANK1
TBLR BANK2
TBLR BANK3
TBLR BANK6
ADD_ONE
TBLR BANK1

In this alternate technique, the accumulator value is only changed once every sixth cycle, such that only three cycles are required for each memory.

In a second method, an instruction LACK is utilized which is an instruction that is operable to load the accumulator with an eight bit constant. In the memory, the instructions are sequenced through by changing the memory location in a particular bank. Each memory location has the instruction LACK in the high byte portion and the eight bit constant in the low byte portion. This provides the sixteen bit location which is sequentially loaded onto the bus 72 during execution of instructions, i.e., sequencing through a predetermined number of adjacent locations in a given bank.

This is illustrated in FIG. 22, where it can be seen that the instructions are loaded in a sequential manner. It is noted that each of the eight bit words are comprised of a five bit portion and three bits that cannot be used. This is because only five bit data is present in the memory and the system only recognizes five bit words, each of these five bit words then converted into a count value. In one operation, these three upper bits in the eight bit word can be used in an interleave operation to slow the system down. The counter is operable to store an interleave number, such as "001" and compare the upper three bits in the low byte portion therewith. Therefore, there can be the same upper three bits associated with every third location, for example, such that only every third five bit data word that is placed onto the bus is recognized as one to be written to the disk. On the next pass through, the number to be matched is changed and the next adjacent location will have the matching three bit data word stored in the upper three bits of the eight bit words. This allows the system to slow down the operation.

Referring now to FIG. 23, there is illustrated a block diagram of the counter. The counter is generally comprised of a controllable up/down counter 454 which is operable to, in one mode, receive an eight bit word on the data bus 72 and load the data in the counter and begin to either count down or count up. The output count value is provided on an output bus 456, which is input to a state machine 458. This state machine is operable to control the overall operation for the Read and Write and control of the counter. In a Write operation, the value to be written is loaded into the counter 450 upon receiving a control signal LDCNT on a line 460 from the state machine 458. The counter is controlled by the fast clock signal to count down from the loaded value. The state machine 458 is operable to monitor this operation and, when the count value has reached a value of "0", the state machine outputs a clock edge on the line 462 to the clock input of a set/reset flip flop 464, which changes the Q-BAR output from a high to a low, this indicating a Write operation at an edge 468. After a predetermined number of additional count cycles, a reset signal is generated on the reset input of the flip flop 465 to reset the output of the "high" again.

During a Read operation, the counter operation is initiated at a predetermined time in the instruction cycle and then the counter allowed to count down, or count up, in another embodiment. When the Read pulse is detected, the count operation is terminated and the count value held until the value in the counter is transferred to the data bus 72. Thereafter, the counter is reset and the next Read operation performed.

In a Read operation, it is necessary to account for a number of anomalies that may exist on the disk. These can result due to such things as a peak shift, bit crowding and instantaneous speed variations (ISV). Peak shifting is a phenomenon that is due to imbalances in the drive or head electronics. This provides alternating patterns over various cycles. To account for bit crowding, a known pattern is disposed on the first part of each track that is 512 bytes long. It is comprised of sixteen "0"s, sixteen "1"s, sixteen "2"s . . . and sixteen "31"s. These values are utilized to create a table of offsets. Once this table is created, it is then only necessary to access the lookup table to see the relationship that exists on the actual disk that is being read and then "create" a transformation relationship that is then utilized to provide a conversion.

During a Read operation, a Read instruction LARK, having a hexadecimal value of "70" is executed which indicates that the immediately following low byte 8 bit constant is loaded into the auxiliary register. However, whenever the special register is turned on with the instruction SPCL, a different operation is performed. When the special register is turned on, the LARK instruction in the high byte portion of the memory location is read and placed onto the eight bit data bus. The DSP recognizes this instruction and, since the special register is turned on, places the memory in a Write mode and also indicates to the counter that it is to place the contents stored therein onto the data bus. On the next eight bit cycle, i.e., the low byte cycle of the memory, the data on the data bus is stored in the memory location pointed to by the program counter register. This is the location which, during a normal operation, would have had the constant therein read out of the memory, placed onto the bus and then stored in the auxiliary register. In this mode, data is put onto the bus by the counter and stored in the memory location.

Referring now to FIG. 24, there is illustrated a timing diagram of the operation described above. At the leading edge of TCC, an instruction 470 is placed onto the data bus which is the hexadecimal value "70" indicating a LARK instruction. At the same time, the IOW signal line is raised high by the ASIC 82 indicating to the rest of the system that an input/output instruction is to be executed. When the IOW signal goes low, this is an indication to the counter that it is to output the contents thereof to the bus. The Write enable signal is then drawn from a high to a low to write the information on the bus to the address memory location.

During a given instruction cycle, there are two portions to the memory operation, a high byte operation and a low byte operation. The high byte operation operates on the upper eight bits of the memory cell during the first half of the instruction cycle and the low byte portion operates on the least significant bits of the memory location during the second half of the instruction signal. The Write enable operation operates in the second half of the cycle to write the data on the bus to the lower eight bits of the memory cycle. Therefore, in the memory, the organization is such that a series of adjacent LARK instructions are disposed in adjacent memory locations. Each time the LARK instruction is output onto the bus, this indicates that the counter should place the contents thereof onto the bus and then the system will write this to the lower eight bits of the memory location at the end of an instruction cycle. At the end of an instruction cycle, the program counter is incremented and the next storage location is read placing the next LARK instruction onto the bus. This continues in a sequential manner such that a pipeline operation results.

Figure 25A:
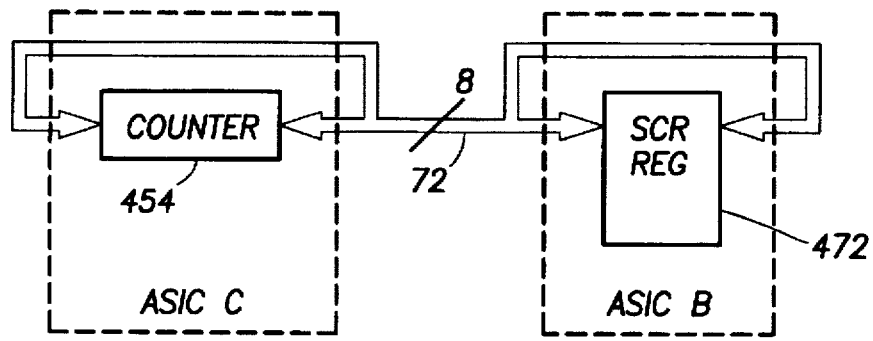
FIGS. 25a and 25b illustrate a diagrammatic view of the counter and timing diagram, respectively, of an alternate Read method.
Figure 25B:
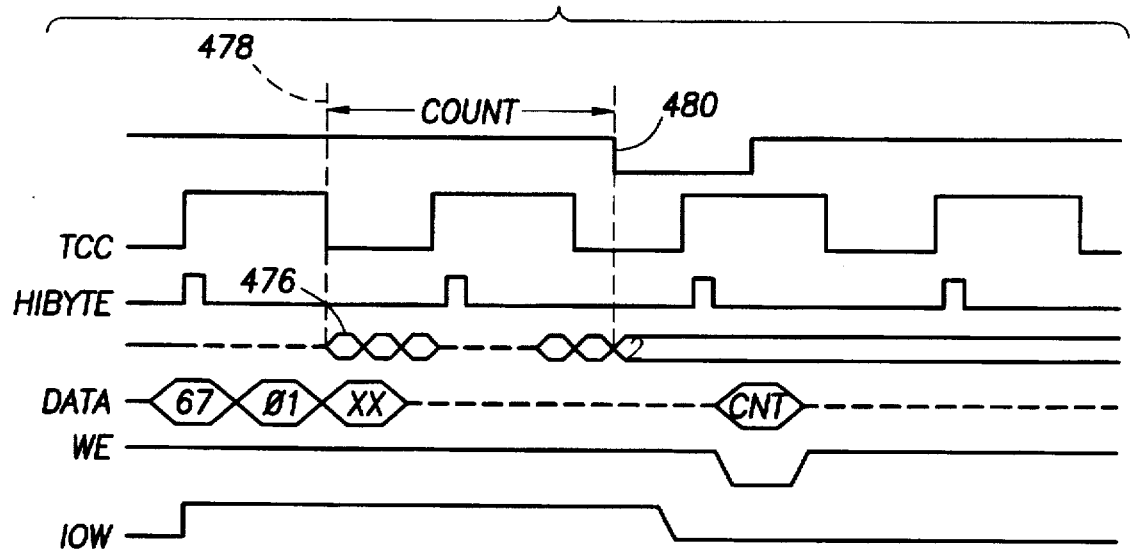

Referring now to FIG. 25a, there is illustrated a diagrammatic view of an alternate Read method. In the alternate Read method, the counter 454 is operable to output the contents thereof onto the bus 72 and store it in a scratch register 472. The scratch register 472 is basically disposed on the same ASIC associated with the I/O operations of the drive, whereas the counter 454 is disposed on the ASIC associated with the Encode/Decode operations. In this mode, the scratch register is provided with addresses and the data is output onto the bus and stored in the addressed location of the scratch register. This is illustrated in the timing diagram of FIG. 25b. In this operation, the program instruction at the location pointed to by the program register is output, indicating a TBLR operation, this being the "67" hexadecimal instruction. This is followed by the register value, the Bank 1 value, that is to be stored. The counter is initiated at a time indicated by reference numeral 476 and then is operable to count down from a reference point 478 up to the time when the detected peak occurs, as indicated by an edge 480 that is output from the drive and decoded. This then stops the counter and holds the value therein. A Write enable then occurs to write this value to a memory location in the accumulator.

Figure 26B:
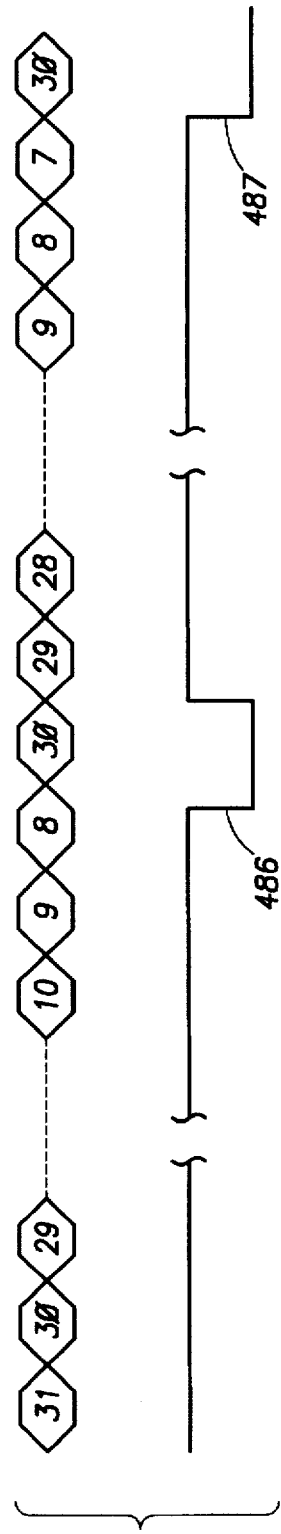
FIGS. 26a and 26b illustrate a timing diagram for the synchronization operation.
Figure 26A:
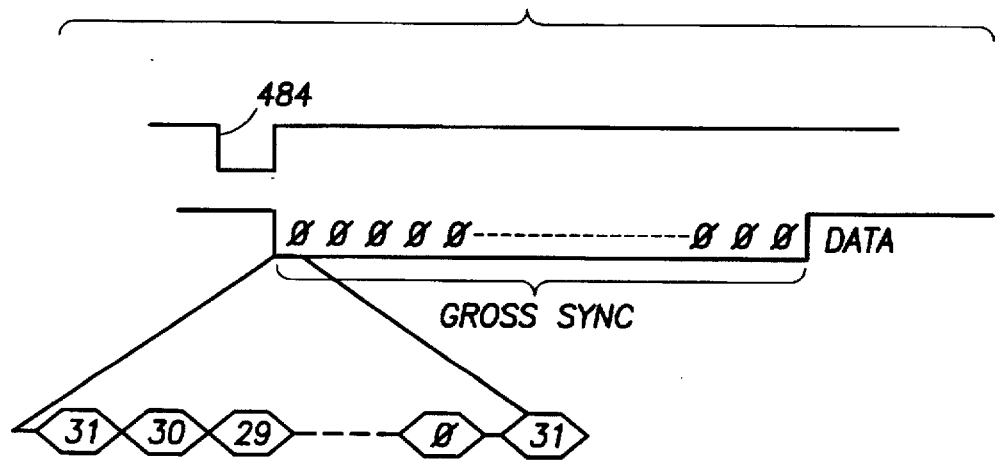

Referring now to FIGS. 26a and 26b, there is illustrated a timing diagram as depicted in the operation of syncing up with the "0" operation. Initially, an index pulse 484 is received for each physical cyclinder. This is a signal output by the drive. This index pulse indicates the beginning of a particular cylinder. A gross sink field is provided at the beginning of each cylinder which is comprised of 32 zeros. As described above, these are not necessarily logic "0s" but, rather, they are a sync value. When the system sees this value, it understands that this is a sync value. Initially, the counter may be running such that the count value will reach a zero before the actual pulse is received, indicating a zero. Since the system knows it is a zero, it realizes that the system is out of sync. The counter is a "rollover" counter which initiates the count at a value of "31" and then counts to a value of "0". If the counter is in sync, the counter will initiate its value at a value of "31" and the final value of "0" will occur when the output pulse is detected from the drive. This is illustrated in FIG. 26a. However, FIG. 26b illustrates a situation wherein the counter only reaches a value of "8" prior to a first detected output pulse edge 486 being detected. Since the system knows that this is a "0", the system is out of sync. At this time, the count value of the counter is decremented by a value of "1" such that the count value will begin at a value of "30" at the next rollover point. Therefore, the next time that a pulse edge 487 occurs, the count value will now be at a value of "7". This will continue until a value of "0" occurs. This in essence deletes a count value such that the overall operation of the counter is synchronized. Thereafter, there will exactly 32 counts for each cycle of the counter. Typically, the counter cycles completed in two instruction cycles.

Additionally, the instructions themselves must be synchronized with the overall operation. In order to do this, the Read operation is performed during the initial gross sync cycle. When a Read operation is performed, a predetermined number of instruction cycles are allocated and the Read operation then executed in accordance with the Read instructions. If the system is synchronized such that the time for reading results in a "0" being read, then the instructions are synchronized with the overall operation. Since there are a number of different instructions that are to be executed, the sequence of the instructions and their relative time to the overall clocking of the counter, data being placed on the bus and written into the memory, it is necessary to insure that the sequence occurs within the necessary instruction cycle. To achieve this, the system determines whether three Read operations can be performed in a row to output three consecutive "0s". If so, this indicates that the instructions are in sequence. However, if three Read operations are not performed, then an adjustment is made to the instruction sequence in the form of inserting non-operative instructions NOP. The operation is as follows:

| TEST: | IN | PORTC |
|---|---|---|
|  | NOP |  |
|  | NOP |  |
|  | BIO | INSYNC |
|  | NOP |  |
|  | B | TEST |
| INSYNC: |  |  |

The first instruction in this sequence is two cycles long and is operable to input data from PORT C. This is followed by two NOP instructions, each one cycle long, for a total of four instruction cycles. The next instruction is BIO, which is a two cycle instruction that indicates that the program is to branch whenever an INSYNC signal is low. The INSYNC signal is the output of an AND gate which receives the TCC instruction clock signal and the count value output, whenever the count value output is at a count zero. Therefore, whenever the edge of TCC and the edge of the COUNT ZERO input is low, this will provide the INSYNC signal. This means that a zero has been read. However, if the INSYNC signal is not low, then the next instruction is an NOP signal and this inserts an additional cycle into the instruction sequence. The next instruction is required to branch back and again test for whether the INSYNC signal is low. This will continue until three consecutive INSYNC signals are read. In effect, this just inserts an additional cycle into the sequence, as was the case with the additional count deletions for syncing up the counter.

In summary, there has been provided a system for increasing the density of a conventional 1.44M floppy disk drive. This system utilizes a conventional 1.44M disk drive with an interface board disposed between a controller and a disk drive. This interface board is operable to receive the conventional MFM drive signals during a Write operation and convert them to a super high density format. The super high density format utilizes a pulse width modulation signal wherein a five bit data value is utilized to pulse width modulate the signal within a bit field. In the prior MFM format, only a single bit is stored in the bit field, whereas the PWM technique allows a higher number of bits to be stored in a bit field for the MFM format. The interface board has sufficient intelligence to read the super high density data format whenever a disk having such a format is disposed in the drive. However, the interface board also is operable to recognize whenever a 1.44M formatted diskette is disposed in the drive and will allow this to be read in a conventional format. The interface board allows the super high density format to be transparent to the operation of the system, such that the system appears to be writing to a 1.44M drive.

Although the preferred embodiment has been described in detail, it should be understood that various changes, substitutions and alterations can be made therein without departing from the spirit and scope of the invention as defined by the appended claims.

What is claimed is:

1. A high density magnetic media data storage system wherein an interval of time in which a pulse may be written to the magnetic media is called a "TDU cell", comprising:

a data buffer for storing data words to be stored on the magnetic media, said data buffer operable to output said stored data words in a predetermined order to be recorded on the magnetic media;

a timing system for defining a plurality of TDU cells on the surface of the magnetic media along the surface thereof as the surface passes a fixed point, each of said TDU cells having a defined time length and moving sequentially past said fixed point;

said timing system operable to define a reference pulse for each of said TDU cells;

a modulator for defining a variable length of time from said reference pulse to a record time within said TDU cell, said variable length of time defined by the value of one of said data words received from said data buffer, the variable length of time being divided into a plurality of increments, each of the increments constituting a predetermined length of time offset from said reference pulse, each increment referenced to the reference pulse such that each incremental value of said data word corresponds to one of the increments;

a recording mechanism for recording a magnetic flux pulse on the magnetic media at said record time for each of said TDU cells, such that the magnetic flux pulse represents a data word having a plurality of bits of information based upon the selected increment in which the magnetic flux pulse is recorded; and a data controller for sequentially feeding said data words to said modulator from said data buffer.

2. The data storage system of claim 1, wherein the media is a disk-shaped member with said TDU cells disposed on cylinders that extend outward from the rotational center thereof and wherein said record head is operable to be disposed radially along the surface of the media.

3. The data storage system of claim 1, and further comprising, a synchronization system for encoding synchronization information within select ones of said TDU cells.

4. The data storage system of claim 1, wherein said synchronization system comprises a predetermined length of time for said variable length of time that is outside the range of said variable length of time for said data words.

5. The data storage system of claim 1, wherein the TDU cells are disposed on the surface of the magnetic media in a curvilinear manner, with the magnetic media being a planar surface.

6. The data storage system of claim 1, and further comprising a demodulator for demodulating the data stored in said TDU cells, said demodulator comprising:

a Read mechanism for detecting said recorded magnetic flux pulse as the magnetic media passes by a fixed reading point;

a timing decode mechanism for determining the position of said magnetic flux pulse within said TDU cell after detection thereof and determining a decoded length of time between said reference pulse and said detected pulse; and a decoder for generating said data value associated with said decoded length of time within said TDU cell and outputting a data value associated with said decoded length of time in said TDU cell.

7. The data storage system of claim 1, wherein the magnetic media is a disk-shaped member with said flux transitions disposed on cylinders that extend outward from the rotational center thereof and wherein said recording mechanism is operable to be disposed radially along the surface of the magnetic media.

8. A high density magnetic media data storage system, comprising:

a data buffer for storing data words to be stored on the magnetic media said data buffer operable to output said stored data words in a predetermined order to be recorded on the magnetic media;

a timing system for defining a plurality of bit cells on the surface of the magnetic media along the surface thereof as the surface passes a fixed point, each of said bit cells having a defined time length and moving sequentially past said fixed point;

said timing system operable to define a reference pulse for each of said bit cells;

a modulator for defining a variable length of time from said reference pulse to a record time within said bit cell, said variable length of time defined by the value of one of said data words received from said data buffer, wherein said variable length of time is divided upon into a plurality of increments, each increment referenced to a bit clock signal such that each increasing value of said data word increases the variable length of time by one of said increments, each of said increments constituting a predetermined number of said bit clock cycles;

a recording mechanism for recording a magnetic flux pulse on the magnetic media at said record time for each of said bit cells such that the relative position in time of said record time directly corresponds to the value of a recorded data word; and a data controller for sequentially feeding said data words to said modulator from said data buffer.

9. The data storage system of claim 8, and further comprising a demodulator for demodulating said data stored in each of said bit cells, comprising:

a Read mechanism for passing over said bit cells on the magnetic media at a predetermined rate and outputting a detected pulse within each of said bit cells when said recorded magnetic flux pulse is detected;

a counter having a count operation controlled by said bit clock;

a reset pulse for initiating said counter, said reset pulse occurring at a predetermined time during each of said bit cells;

said count operation terminated at the occurrence of said detected magnetic flux pulse; and a decoder for decoding said count value to generate said digital value associated with said count value, which corresponds to the associated one of said increments during the record operation and the value of the associated one of said data words encoded in said recorded magnetic flux pulse.

10. A method for storing data on a high density magnetic media wherein an interval of time in which a pulse may be written to the magnetic media is called a "TDU cell", comprising the steps of:

storing data words in a data buffer that are to be subsequently stored on the magnetic media in TDU cells;

defining through a timing system a plurality of the TDU cells on the surface of the magnetic media along the surface thereof as the surface passes a fixed point, each of the TDU cells having a defined time length and moving sequentially past the fixed point;

defining with the timing system a reference pulse for each of the TDU cells;

providing a modulator;

operating the modulator to define a variable length of time from the reference pulse to a record time within the TDU cell, the variable length of time defined by the value of one of the data words received from the data buffer;

recording a magnetic flux pulse on the magnetic media at the record time for each of the TDU cells such that the relative position in time of the record time directly corresponds to the value of the recorded data word, the magnetic flux pulse representing a plurality of bits of information recorded on a magnetic media at the record time, the length of time between the reference pulse and the magnetic flux pulse being divided into a plurality of increments, each increment referenced to the reference pulse such that each incremental value of the data word corresponds to one of the increments, each of the increments constituting a predetermined length of time offset form the reference pulse; and sequentially feeding the data words form the data buffer to modulator.

11. The method of claim 10, wherein the media is a disk-shaped member with the TDU cells disposed on cylinders that extend from the rotational center thereof and wherein the step of recording is operable to dispose a record head radially along the surface of the media.

12. The method of claim 10, and further comprising the step of encoding synchronization information within select ones of the TDU cells.

13. The method of claim 12, wherein the step of encoding synchronization information comprises defining the variable length of time in the step of operating the modulator to be a predetermined length of time for the time of the step of encoding that is outside the range of the variable length of time for the data words.

14. The method of claim 10, and further comprising the step of demodulating the data stored in the TDU cells, the step of demodulating comprising:

detecting the recorded magnetic flux pulse as the magnetic media passes by a fixed reading point;

determining the position of the magnetic flux pulse within the TDU cell after detection thereof and determining a decoded length of time between the reference pulse and the detected pulse; and generating the data value associated with the decoded length of time within the TDU cell and outputting a data value associated with the decoded length of time in the TDU cell.

15. The method of claim 10, wherein the TDU cells are disposed on the surface of the magnetic media in a curvilinear manner, with the magnetic media being a planar surface.

16. A method for storing data on a high density magnetic media, comprising the steps of:

storing data words in a data buffer that are to be subsequently stored on the magnetic media in bit cells;

defining through a timing system a plurality of the bit cells on the surface of the magnetic media along the surface thereof as the surface passes a fixed point, each of the bit cells having a defined time length and moving sequentially past the fixed point;

defining with the timing system a reference pulse for each of the bit cells;

providing a modulator;

operating the modulator to define a variable length of time from the reference pulse to a record time within the bit cell, the variable length of time defined by the value of one of the data words received from the data buffer, wherein the variable length of time is divided up into a plurality of increments, each increment referenced to a bit clock signal such that each increasing value of a data word increases the variable length of time by one of the increments, each of the increments constituting a predetermined number of the bit clock cycles.

recording a magnetic flux pulse on the magnetic media at the record time for each of the bit cells such that the relative position in time of the record time directly corresponds to the value of the recorded data word; and sequentially feeding the data words from the data buffer to the modulator.

17. The method of claim 16, further comprising the step of demodulating the data stored in each of the bit cells, comprising the steps of:

providing a Read mechanism;

passing the Read mechanism over the bit cells on the magnetic media at a predetermined rate and outputting a detected pulse within each of the bit cells when the recorded magnetic flux pulse is detected;

providing a counter;

operating the counter to provide a count operation and controlling the count operation with the bit clock;

initiating the counter with a reset pulse, the reset pulse occurring at a predetermined time during each of the bit cells;

terminating the count operation at the occurrence of the detected magnetic flux pulse; and decoding the count value to generate the digital value associated with the count value, which responds to the associated one of the increments during the record operation and the value of the associated one of the data words encoded in the recorded magnetic flux pulse.

18. A method for storing data on a magnetic media, comprising the steps of:

defining through a timing system a length of time offset from a first pulse, such that a second pulse representing a plurality of bits of information is recorded on a magnetic media at the end of such length of time, the length of time being divided into a plurality of increments, each increment referenced to the first pulse such that each incremental value of the data word corresponds to one of the increments, each of the increments constituting a predetermined length of time offset from the first pulse;

recording a first flux transition on the magnetic media with the first pulse; and, recording a second flux transition on the magnetic media with the second pulse, the second flu transition representing a plurality of bits of information, the second flux transition being offset from the first flux transition by a delay in time, wherein the delay in time corresponds to one of said increments.

19. The method according to claim 18, further comprising the steps of:

reading back and decoding the plurality of bits of information according to the position of the second pulse relative to the first pulse; and, performing error detection and correction using a Reed Solomon error correction/detection algorithm on the plurality of bits of information that are read back and decoded.

20. An apparatus for storing data on magnetic media, comprising:

a magnetic media;

a timing system defining a length of time offset form a first pulse, such that a second pulse representing a data word having a plurality of bits of information may be recorded on the magnetic media at the end of such length of time, the length of time being divided into a plurality of increments, each increment referenced to the first pulse such that each incremental value of the data word corresponds to one of the increments, each of the increments constituting a predetermined length of time offset from the first pulse; and, a recording mechanism for recording a first flux transition and a second flux transition on the magnetic media responsive to said first and second pulses, respectively, the second flux transition representing a plurality of bits of information, the second flux transition being offset from the first flux transition by a delay in time, wherein the delay in time corresponds to one of said increments.

21. The apparatus according to claim 20, further comprising:

a read mechanism for reading back and decoding the plurality of bits of information according to the position of the second pulse relative to the first pulse; and, an error detection and correction circuit for performing error detection and correction using a Reed Solomon error correction/detection algorithm on the plurality of bits of information that are read back and decoded.

22. The data storage system of claim 20, further comprising:

a detection mechanism for detecting said recorded flux transitions as the magnetic media moves relative to the detection mechanism;

a timing mechanism for determining a length of time between detection of the first flux transition and the second flux transition; and, a decoder for generating a digital representation of a plurality of bits of information in the data word value represented by the offset between the first flux transition and the second flux transition recorded on the magnetic media.

23. The data storage system of claim 22, wherein:

said timing mechanism comprises a counter having a count operation controlled by a clock, where the count operation starts when the first flux transition is detected and stops when the second flux transition is detected.

24. An apparatus for storing data on a media using one transition to represent a plurality of data bits, comprising:

a storage device capable of recording data as transitions in a physically alterable media;

a timing system defining a length of time offset form a first pulse, such that a second pulse representing a plurality of data bits may be recorded on the media at the end of such length of time, the length of time being divided into a plurality of increments, each increment referenced to the first pulse such that each incremental value of the data word corresponds to one of the increments, each of the increments constituting a predetermined length of time offset from the first pulse; and, a recording mechanism for recording a first transition in the media responsive to said first pulse and for recording a second transition in the media responsive to said second pulse, the second transition representing a plurality of data bits, the second transition being offset from the first transition by a delay in time, wherein the delay in time corresponds to one of said increments.

25. The apparatus according to claim 19, further comprising:

a read mechanism for reading back and decoding the plurality of bits of information according to the position of the second pulse relative to the first pulse; and, an error detection and correction circuit for performing error detection and correction using a Reed Solomon error correction/detection algorithm on the plurality of bits of information that are read back and decoded.

26. A method for storing data on a media using one transition to represent a plurality of data bits, comprising the steps of:

defining through a timing system a length of time offset from a first pulse, such that a second pulse representing a plurality of data bits is recorded in a media at the end of such length of time, the length of time being divided into a plurality of increments, each increment referenced to the first pulse such that each incremental value of the data bits corresponds to one of the increments, each of the increments constituting a predetermined length of time offset from the first pulse;

recording a first transition in the media with the first pulse; and, recording a second transition in the media with the second pulse, the second transition representing a plurality of data bits, the second transition being offset from the first transition by a delay in time, wherein the delay in time corresponds to one of said increments.

27. The method according to claim 26, further comprising the steps of:

reading back and decoding the plurality of bits of information according to the position of the second pulse relative to the first pulse; and, performing error detection and correction on the plurality of bits of information that are read back and decoded using a Reed Solomon error correction/detection algorithm.

* * * * *